(12) United States Patent
Rao et al.

(10) Patent No.: US 11,726,889 B1
(45) Date of Patent: Aug. 15, 2023

(54) MACHINE-LEARNING-BASED TECHNIQUES FOR PREDICTIVE MONITORING OF A SOFTWARE APPLICATION FRAMEWORK

(71) Applicants: ATLASSIAN PTY LTD., Sydney (AU); ATLASSIAN, INC., San Francisco, CA (US)

(72) Inventors: Shashank Prasad Rao, Noida (IN); Vipul Gupta, Bangalore (IN); Akshar Prasad, Bengaluru (IN)

(73) Assignees: ATLASSIAN PTY LTD., Sydney (AU); ATLASSIAN, INC., San Francisco, CA (US)

( * ) Notice: Subject to any disclaimer, the term of this patent is extended or adjusted under 35 U.S.C. 154(b) by 0 days.

(21) Appl. No.: 17/657,237

(22) Filed: Mar. 30, 2022

(51) Int. Cl.
*G06F 11/34* (2006.01)
*G06F 11/30* (2006.01)
*G06N 20/20* (2019.01)
*G06F 11/32* (2006.01)

(52) U.S. Cl.
CPC .......... *G06F 11/302* (2013.01); *G06F 11/327* (2013.01); *G06N 20/20* (2019.01)

(58) Field of Classification Search
CPC ...... G06F 11/302; G06F 11/327; G06F 40/58; G06F 11/3495; G06F 2201/83; G06F 11/0775; G06F 40/20; G06F 11/0709; G06N 20/20; G06N 20/00; G06N 3/044; G06N 3/045
See application file for complete search history.

(56) References Cited

U.S. PATENT DOCUMENTS

| | | | |
|---|---|---|---|
| 2016/0180645 A1* | 6/2016 | Webb | G07F 17/323 463/27 |
| 2020/0184355 A1* | 6/2020 | Mehta | G06F 11/3476 |
| 2020/0210149 A1* | 7/2020 | Caldwell | G06F 11/3604 |
| 2020/0242483 A1* | 7/2020 | Shashikant Rao | G06N 5/01 |
| 2021/0034712 A1* | 2/2021 | Dasgupta | G06F 30/20 |
| 2021/0150259 A1* | 5/2021 | Dasgupta | G06F 18/231 |
| 2021/0191802 A1* | 6/2021 | Hunter | G06F 11/0793 |

OTHER PUBLICATIONS

Apparatuses, Computer-Implemented Methods, And Computer Program Products For Improved Data Event Root Cause Identification And Remediation, U.S. Appl. No. 17/644,988.
(Continued)

*Primary Examiner* — Abdullahi E Salad
(74) *Attorney, Agent, or Firm* — Alston & Bird LLP

(57) ABSTRACT

Systems and methods provide techniques for more effective and efficient predictive monitoring of a software application framework. For example, various embodiments of the present invention provide methods, apparatuses, systems, computing devices, and/or the like that are configured to enable effective and efficient predictive monitoring of a software application framework using alert signatures for the software application that are generated by using at least one of first-order alert classification machine learning models, temporal-sequential alert classification machine learning models, categorical-sequential alert classification machine learning models, alert classification machine learning models, and second-order alert classification machine learning models.

20 Claims, 13 Drawing Sheets

(56) References Cited

OTHER PUBLICATIONS

Apparatuses, Methods, And Computer-Program Products For Predictive Determinations Of Causal Change Identification For Service Incidents, U.S. Appl. No. 17/559,563.
Machine-Learning-Based Techniques For Determining Response Team Prediction For Incident Alerts In A Complex Platform, U.S. Appl. No. 17/454,838.
Machine-Learning-Based Techniques For Predictive Monitoring Of A Software Application Framework, U.S. Appl. No. 17/127,216.
Methods, Apparatuses And Computer Program Products For Generating Responder Alert Data Objects Based On Global Alert Policy Data Objects And Inline Alert Policy Data Objects, U.S. Appl. No. 17/448,615.
Methods, Apparatuses And Computer Program Products For Generating Service Health Status Data Objects And Rendering Health Status Monitoring User Interfaces, U.S. Appl. No. 17/656,529.
Predictive Monitoring Of Software Application Frameworks Using Machine-Learning-Based Techniques, U.S. Appl. No. 17/486,293.

\* cited by examiner

MACHINE-LEARNING-BASED TECHNIQUES FOR PREDICTIVE MONITORING OF A SOFTWARE APPLICATION FRAMEWORK

BACKGROUND

Various methods, apparatuses, and systems are configured to provide techniques for monitoring software application frameworks. Applicant has identified many deficiencies and problems associated with existing methods, apparatuses, and systems for monitoring software application frameworks. Through applied effort, ingenuity, and innovation, these identified deficiencies and problems have been solved by developing solutions that are in accordance with the embodiments of the present invention, many examples of which are described in detail herein.

BRIEF SUMMARY

In general, embodiments of the present invention provide methods, apparatuses, systems, computing devices, and/or the like that are configured to enable effective and efficient monitoring of software application frameworks. For example, certain embodiments of the present invention provide methods, apparatuses, systems, computing devices, and/or the like that are configured to perform software application framework monitoring using alert signatures for the software applications that are generated by using at least one of first-order alert classification machine learning models, temporal-sequential alert classification machine learning models, categorical-sequential alert classification machine learning models, alert classification machine learning models, and second-order alert classification machine learning models.

In accordance with one aspect, a computer-implemented method is provided. In one embodiment, the computer-implemented method comprises: identifying a software alert data object for a software application framework, wherein the software alert data object is associated with one or more alert attribute data fields; generating, using a first-order alert classification machine learning model and based on the one or more alert attribute data fields, an alert representation for the software alert data object, wherein the first-order alert classification machine learning model is configured to generate the alert representation and generate a first-order alert classification score for the software alert data object based on the alert representation; identifying a defined number of attention neighbor software alert data objects, wherein the defined number of attention neighbor software alert data objects are in an encoder attention window for the software alert data object; generating, using an attention-based classification machine learning framework and based on a defined number of attention neighbor attention-based feature sets for the defined number of attention neighbor software alert data objects, an attention-based alert classification score for the software alert data object, wherein each attention neighbor attention-based feature set for a particular attention neighbor software alert data object is determined based on the alert representation for the particular attention neighbor software alert data object; generating an alert signature for the software alert data object based on the attention-based alert classification score; and performing one or more incident management actions based on the alert signature.

In accordance with another aspect, a computer program product is provided. The computer program product may comprise at least one computer-readable storage medium having computer-readable program code portions stored therein, the computer-readable program code portions comprising executable portions configured to: identify a software alert data object for a software application framework, wherein the software alert data object is associated with one or more alert attribute data fields; generate, using a first-order alert classification machine learning model and based on the one or more alert attribute data fields, an alert representation for the software alert data object, wherein the first-order alert classification machine learning model is configured to generate the alert representation and generate a first-order alert classification score for the software alert data object based on the alert representation; identify a defined number of attention neighbor software alert data objects, wherein the defined number of attention neighbor software alert data objects are in an encoder attention window for the software alert data object; generate, using an attention-based classification machine learning framework and based on a defined number of attention neighbor attention-based feature sets for the defined number of attention neighbor software alert data objects, an attention-based alert classification score for the software alert data object, wherein each attention neighbor attention-based feature set for a particular attention neighbor software alert data object is determined based on the alert representation for the particular attention neighbor software alert data object; generate an alert signature for the software alert data object based on the attention-based alert classification score; and perform one or more incident management actions based on the alert signature.

In accordance with yet another aspect, an apparatus comprising at least one processor and at least one memory including computer program code is provided. In one embodiment, the at least one memory and the computer program code may be configured to, with the processor, cause the apparatus to: identify a software alert data object for a software application framework, wherein the software alert data object is associated with one or more alert attribute data fields; generate, using a first-order alert classification machine learning model and based on the one or more alert attribute data fields, an alert representation for the software alert data object, wherein the first-order alert classification machine learning model is configured to generate the alert representation and generate a first-order alert classification score for the software alert data object based on the alert representation; identify a defined number of attention neighbor software alert data objects, wherein the defined number of attention neighbor software alert data objects are in an encoder attention window for the software alert data object; generate, using an attention-based classification machine learning framework and based on a defined number of attention neighbor attention-based feature sets for the defined number of attention neighbor software alert data objects, an attention-based alert classification score for the software alert data object, wherein each attention neighbor attention-based feature set for a particular attention neighbor software alert data object is determined based on the alert representation for the particular attention neighbor software alert data object; generate an alert signature for the software alert data object based on the attention-based alert classification score; and perform one or more incident management actions based on the alert signature.

BRIEF DESCRIPTION OF THE SEVERAL VIEW OF THE DRAWINGS

Having thus described some embodiments in general terms, references will now be made to the accompanying drawings, which are not drawn to scale, and wherein:

Figure 6:
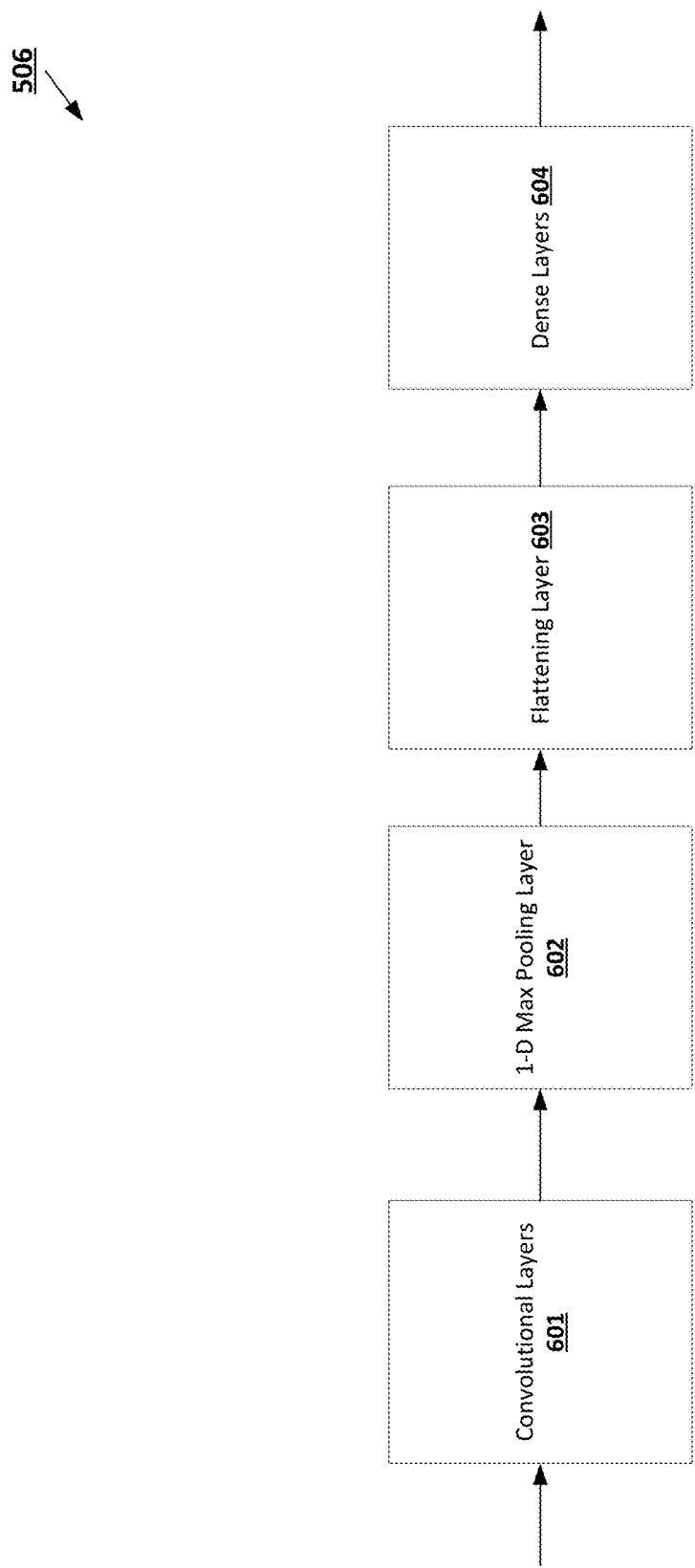

FIG. 6 provides an operational example of a temporal-sequential alert classification machine learning model in accordance with at least some embodiments of the present invention.

Figure 7:
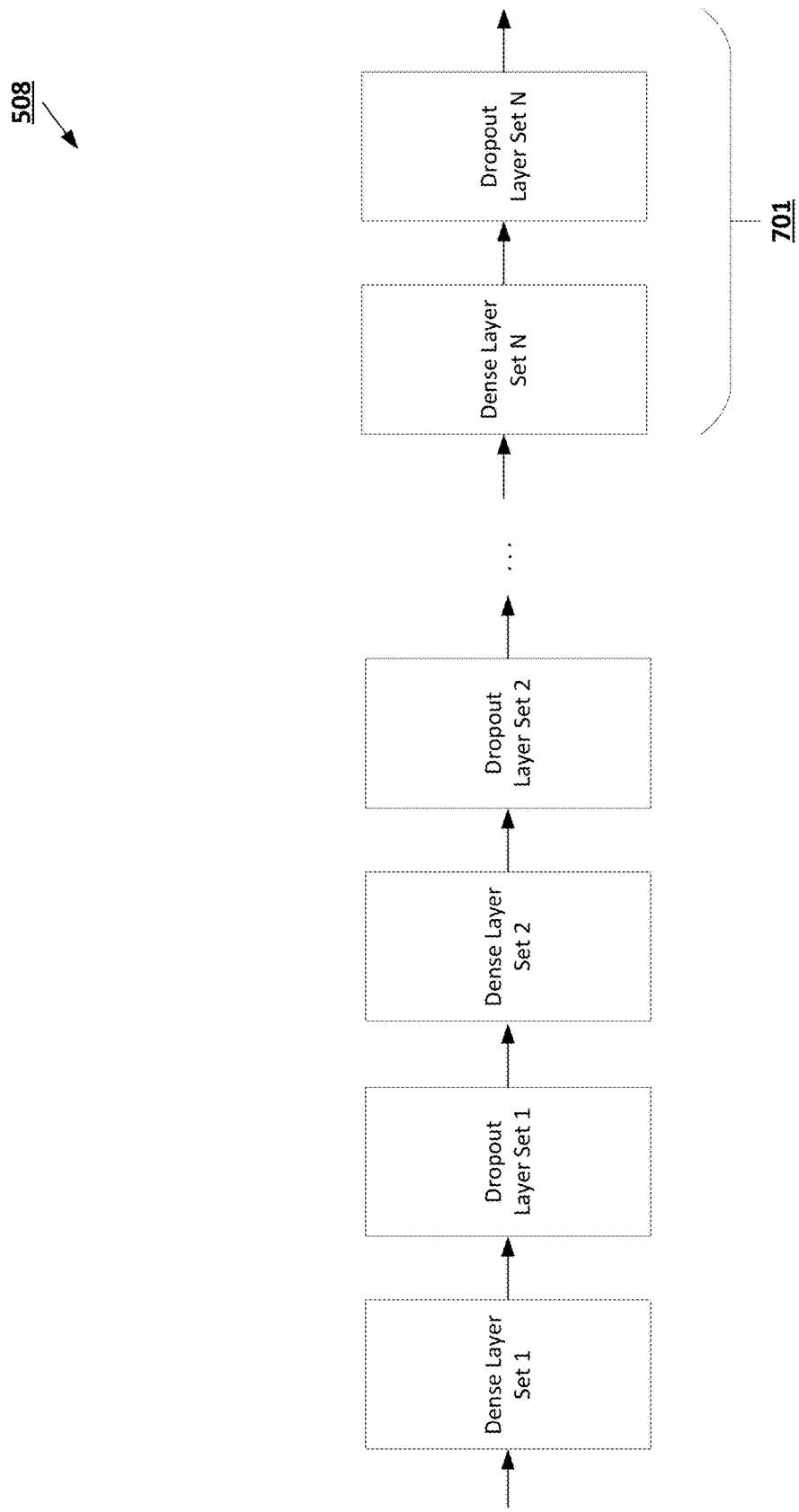

FIG. 7 provides an operational example of a categorical-sequential alert classification machine learning model in accordance with at least some embodiments of the present invention.

Figure 8:
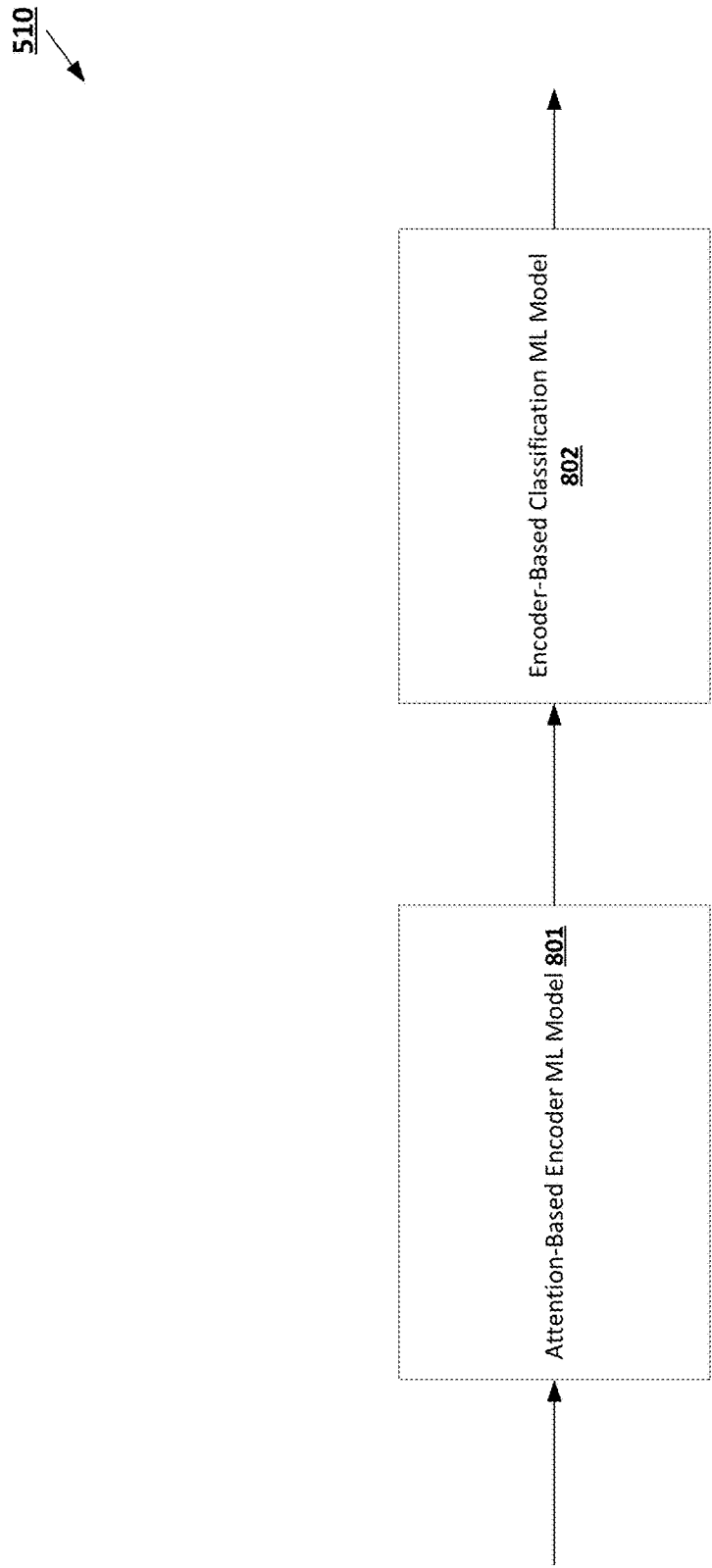

FIG. 8 provides an operational example of an attention-based alert classification machine learning framework in accordance with at least some embodiments of the present invention.

Figure 9:
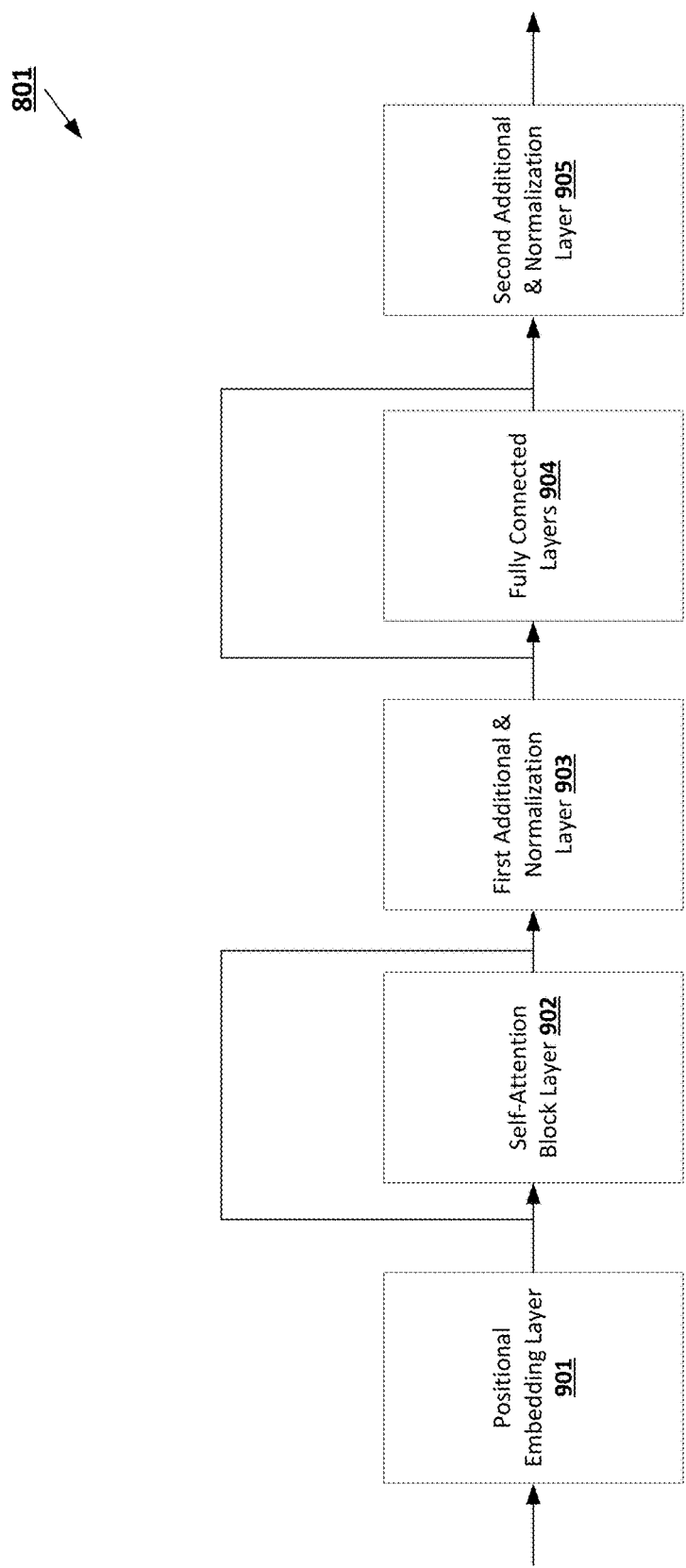

FIG. 9 provides an operational example of an attention-based encoder machine learning model in accordance with at least some embodiments of the present invention.

Figure 10:
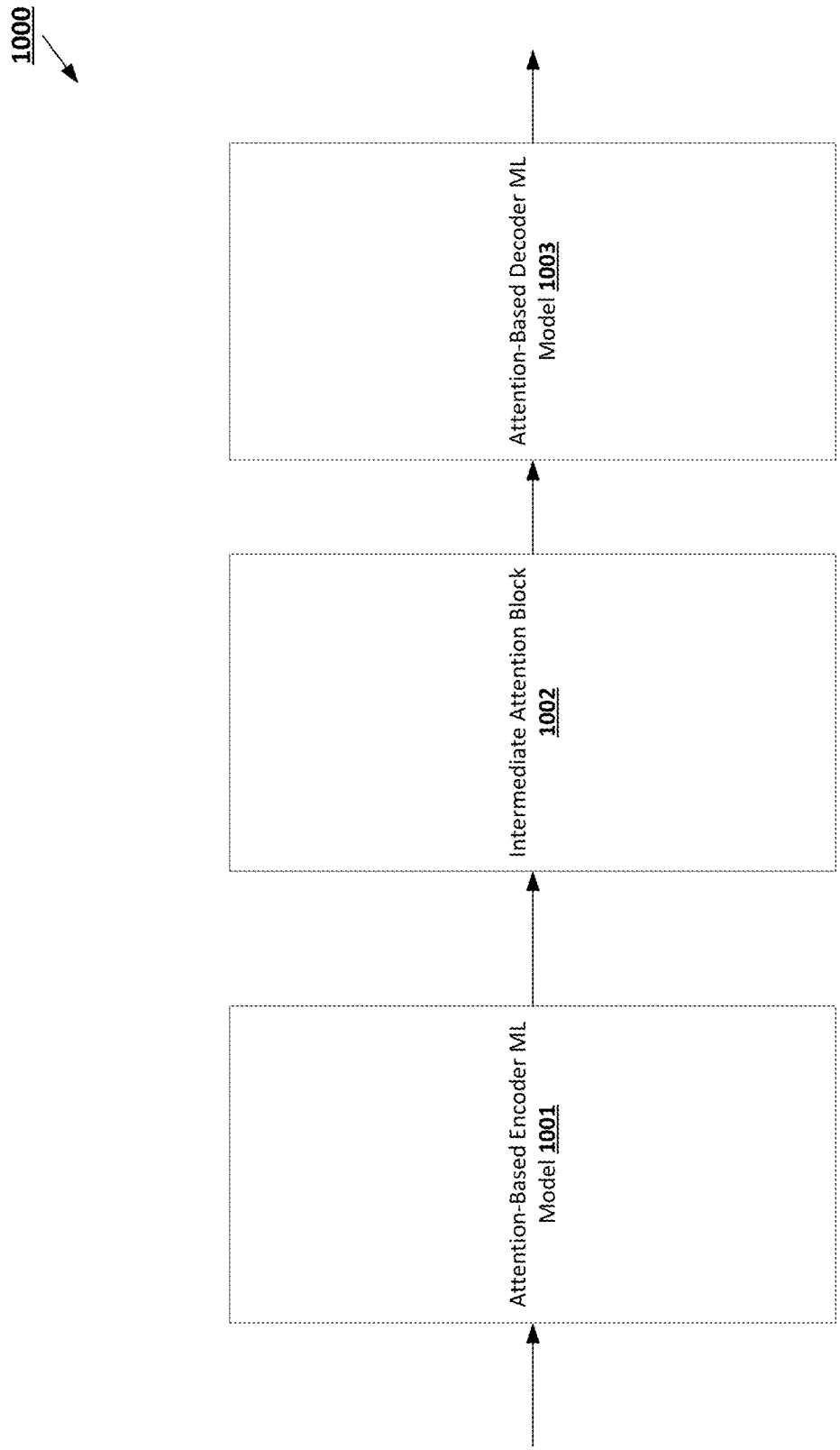

FIG. 10 provides an operational example of an encoder-decoder machine learning framework that is used to train an attention-based encoder machine learning model in accordance with at least some embodiments of the present invention.

Figure 11:
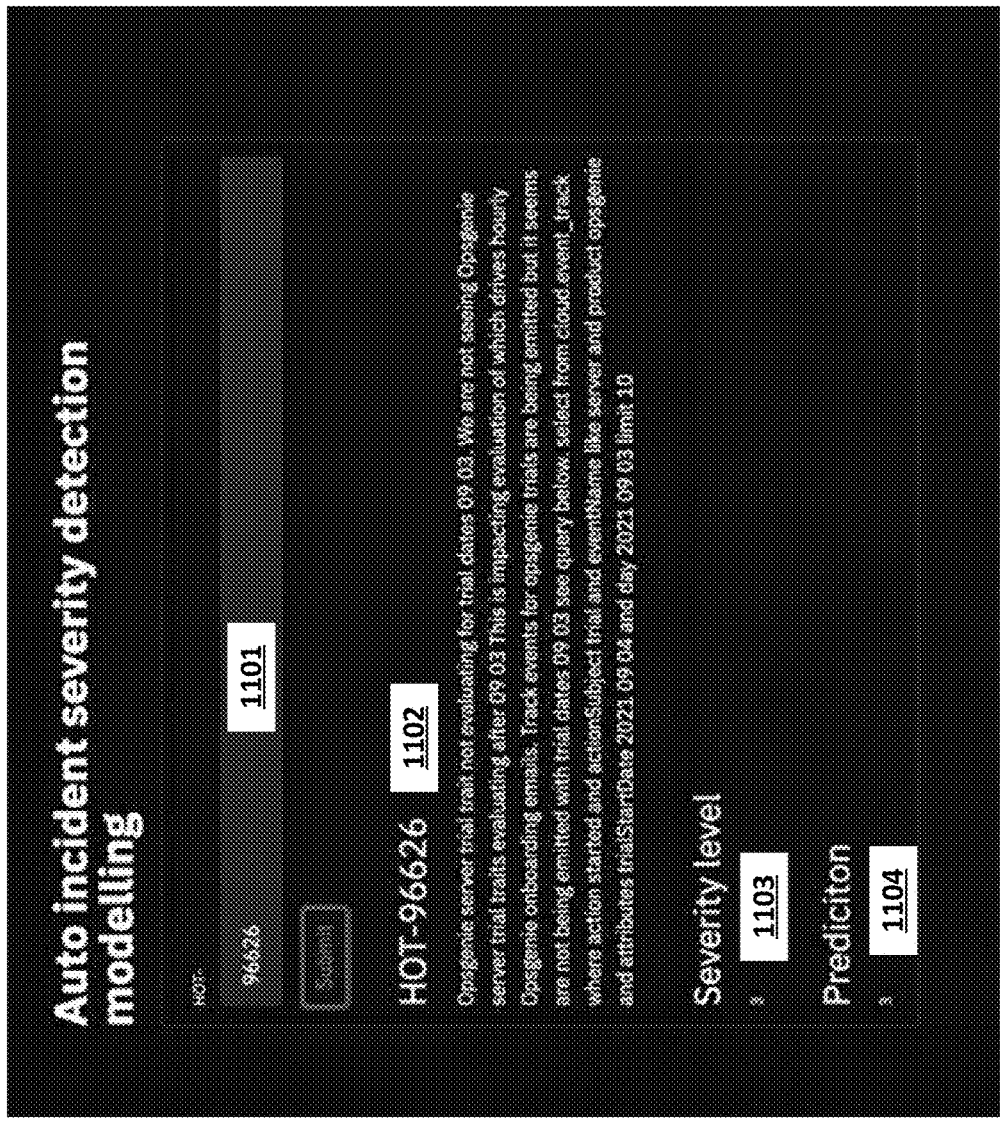

FIG. 11 provides an operational example of a user interface that depicts a predicted alert severity level and a human-generated alert severity level for a software alert data object in accordance with at least some embodiments of the present invention.

Figure 12:
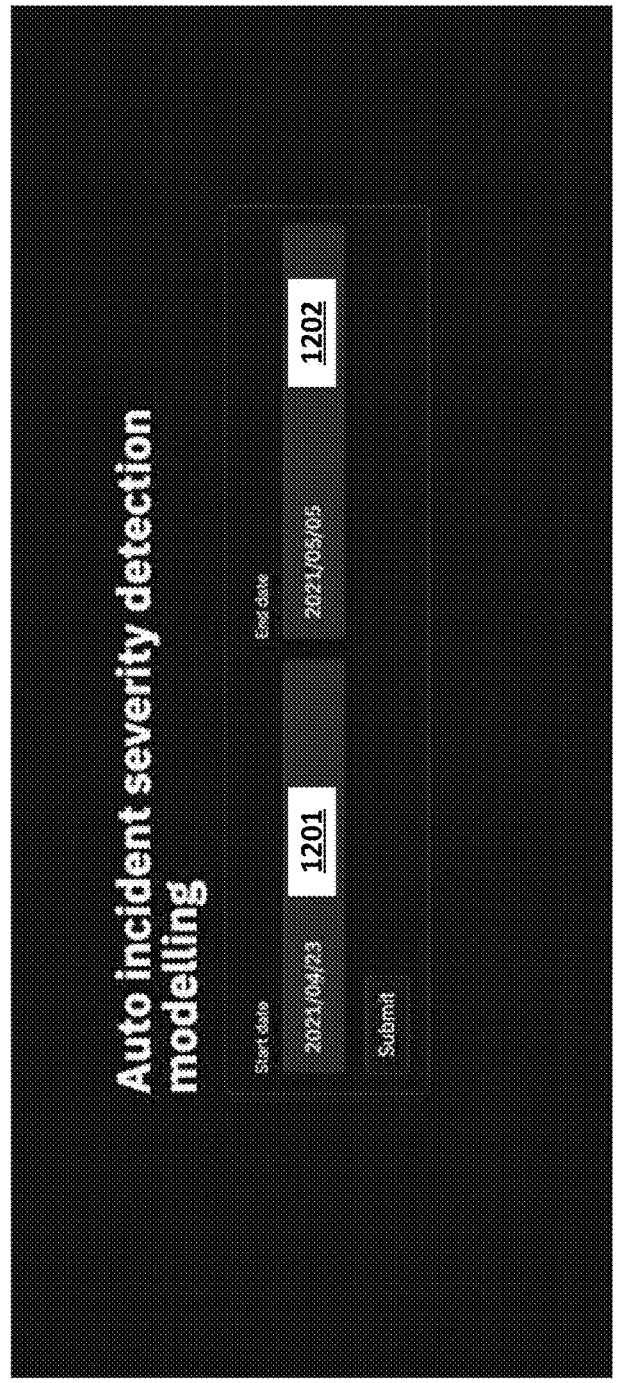

FIG. 12 provides an operational example of a user interface that enables an end user to select a date range for an alert signature in accordance with at least some embodiments of the present invention.

Figure 13:
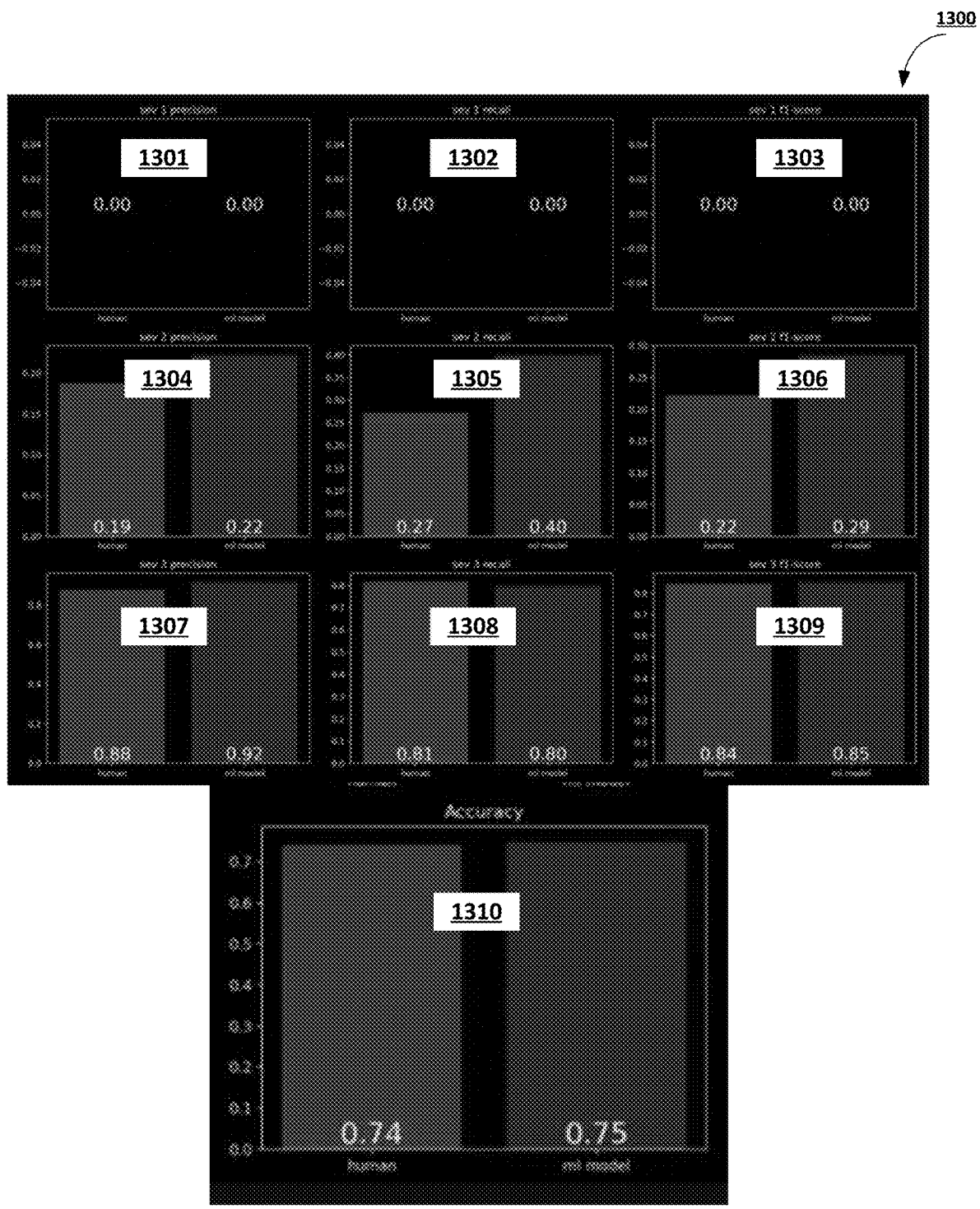

FIG. 13 provides an operational example of a user interface that displays an alert signature with recall rates, precision rates, and $F_1$ rates for subsets of software alert data objects that are categorized based on predicted alert severity levels and human-generated alert severity levels in accordance with at least some embodiments of the present invention.

DETAILED DESCRIPTION OF VARIOUS EMBODIMENTS

Various embodiments of the present invention now will be described more fully hereinafter with reference to the accompanying drawings in which some, but not all, embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense unless otherwise indicated. The terms "illustrative," "example," and "exemplary" are used to be examples with no indication of quality level. Like numbers refer to like elements throughout.

Overview

Various embodiments of the present invention address technical problems associated with efficiently and reliably performing predictive monitoring of complex software application frameworks. The disclosed techniques can be utilized by a software monitoring data management system to generate predictive insights that enhance effectiveness and efficiency of performing software application framework monitoring with respect to complex software application frameworks. An example of such a software monitoring data management system is the Opsgenie® incident management system provided by Atlassian PTY LTD, which enables the collection of software alert data objects for various complex software application frameworks.

A complex software application framework is typically characterized by large networks of interdependent services and microservices that support a myriad of software features and applications. Indeed, some large complex software application frameworks may be comprised of topologies of 1,500 or more interdependent services and microservices. Such complex software application frameworks are nimble, highly configurable, and enable robust collaboration and communication between users at the individual, team, and enterprise level.

Complex software application frameworks typically include large numbers of software applications. Each software application includes a number of features, with many features (e.g., user authentication features) shared between multiple software applications. Other features are supported only by one associated software application or a defined subset of software applications.

A given complex software application framework could support hundreds of software applications and hundreds of thousands of features. Those applications and features could be supported by thousands of services and microservices that exist in vast and ever-changing interdependent layers. Adding to this complexity is the fact that at any given time, a great number of software development teams may be constantly, yet unexpectedly, releasing code updates that change various software services, launch new software services, change existing features of existing software applications, add new software applications, add new features to existing software applications, and/or the like.

Individual software applications or software services may be configured to generate software alert data objects that describe a maintenance-critical state of the software applications or software services. Because of the numerosity of the software applications/services that are hosted by a complex software application framework, a large number of software alert data objects may be generated at any selected time interval. In some circumstances, a subset of the noted software alert data objects may collectively relate to a common maintenance-critical property of the complex software application framework.

For example, consider a scenario in which a first software application of a complex software application framework that is configured to perform database retrieval experiences a failure. In this scenario, in addition to the first software application, each of the frontend software applications that rely on successful data retrieval operations from a target database may generate independent software alert data objects that describe a maintenance-critical state of those frontend software applications. These frontend-generated software alert data objects, while they describe valid maintenance-critical conditions, may not be independently valuable for detecting maintenance needs of the overall complex software application framework and addressing those detected maintenance needs.

As another example, consider another scenario in which a first software application of a complex software application framework that is configured to act as a networking point for a target network experiences a failure. In this scenario, in addition to the first software application, each of the software applications that rely on successful retrieval of data using the target network may generate independent software alert data objects that describe a maintenance-critical state of those software applications. Similar to the frontend-generated software alert data objects described in relation to the previous example, the downstream-generated software alert data objects described in relation to this example may not be independently valuable for detecting maintenance needs of the overall complex software application framework and addressing those detected maintenance needs.

As the examples above illustrate, without generating predictive insights about topical relationships between software alert data objects, a software monitoring data management system will be forced to assess software alert data objects individually, which results in the need for performing additional processing operations and using unnecessary computational resources. This problem is amplified as the number of software applications, features, or services in a complex software application framework grows larger, which in turn leads to data processing problems associated with real-time processing of a large number of software alert data objects.

As the foregoing description will illustrate, a software alert approach that relies exclusively on individual processing of software alert data objects generated by software applications and software application services is not scalable. It immediately becomes highly inefficient to process software alert data objects on an individual level as the complex software application frameworks grow and dynamically change.

To address the above-described challenges related to monitoring complex software application frameworks, various embodiments of the present invention describe techniques for generating alert signatures for software alert data objects of a complex software application framework that are determined based on at least one of first-order alert classification scores for the software alert data objects, temporal-sequential alert classification scores for the software alert data objects, categorical-sequential alert classification scores for the software alert data objects, attention-based alert classification scores for the software alert data objects, and second-order alert classification scores for the software alert data object. In some embodiments, alert representations for software alert data objects generated using a first-order alert classification machine learning model (e.g., a binary alert classifier machine learning model) are grouped across defined temporal windows and/or across grouping categories (e.g., across subsets of software alert data objects that are associated with common team identifiers) to generate sequential alert classification scores that are then merged with attention-based alert classification scores generated using a self-attention mechanism applied to encoder attention windows for software alert data objects to generate alert classification scores. The alert classification scores can, once generated, be used to perform one or more incident management operations/actions with respect to a monitored software application framework.

By using the described techniques, various embodiments of the present invention generate predictive insights about topical relationships between software alert data objects that can be used to increase efficiency and effectiveness of software application and software service monitoring. In doing so, various embodiments of the present invention make substantial technical contributions to improving the efficiency and the effectiveness of monitoring complex software application frameworks.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal.

The term "client computing device" refers to a combination of computer hardware and/or software that is configured to access a service made available by a server. The server is often, but not always, on another computer system, in which case the client accesses the service by way of a network. Client computing devices may include, without limitation, smart phones, tablet computers, laptop computers, wearables, personal computers, enterprise computers, and the like.

The term "server computing device" refers to a combination of computer hardware and/or software that is configured to provide a service to a client device. An example of a server computing device is the software monitoring data management computing device 106 of FIG. 1. In some embodiments, a server computing device communicates with one or more client computing devices using one or more computer networks.

The term "software alert data object" refers to a data construct that is generated by a software application monitoring computing device and transmitted to a software monitoring data management computing device. The software alert data object is configured to describe one or more properties associated with execution, maintenance, configuration management and/or external integration of a software application framework being monitored by the software application monitoring computing device. For example, the software alert data object may describe one or more execution properties associated with execution and/or operation of a software application framework being monitored by the software application monitoring computing device during a maintenance-critical state (e.g., a software failure state) of the software application framework. In some embodiments, a software alert data object describes an alert, which may be generated when a software application monitoring computing device detects a maintenance-critical state of a software application framework. In some embodiments, a software alert data object describes an incident, which may be an unplanned interruption to a service or reduction in the quality of a service or a failure of a software application framework. In some embodiments, a software alert data object is generated based on data (e.g., communication data) transmitted from an external system that is integrated with the software application framework, such as from the Amazon Simple Email Service (SES) system, the Amazon Simple Notification Service (Amazon SNS) system, a videoconferencing software application, and/or the like.

In some embodiments, the software alert data objects describes a set of alert attribute data fields associated with the corresponding mission-critical state. Examples of alert attribute data fields of a software alert data object include one or more numerical attribute data fields, such as a numerical attribute data field describing the deduplication count of the software alert data object, a numerical attribute data field describing the number of other software alert data objects created during a 15-minute window around the creation time of the software alert data object, a numerical attribute data field describing the number of nth priority level software alert data objects created during a 15-minute window around the creation time of the software alert data object (where n may iterate over the range of software alert data object priority levels), an average inter-arrival time of software alert data objects at the creation time of the software alert data object, and/or the like. Other examples of alert attribute data fields of a software alert data object include one or more categorical attribute data fields, such as a categorical attribute data field describing the priority level of the software alert data object (e.g., describing whether the software alert data object is P1, P2, P3, P4, or P5), a categorical attribute data field describing the alert source of the software alert data object (e.g., describing whether the software alert data object is user-initiated, system-initiated, request-initiated, and/or the like), a categorical attribute data field describing whether the creation time of the software alert data object is a weekend or a weekday, and/or the like. Other examples of alert attribute data fields for a software alert data object include an embedded representation of a natural language format field (e.g., an alert message field) of the software alert data object, such as an embedded representation generated based on the output of processing the alert message field of the software alert data object using a text encoder machine learning model such as the Google's Universal Sentence Encoder.

The term "software incident data object" refers to a data construct that is generated by a software application monitoring computing device and transmitted to a software monitoring data management computing device. The software incident data object describes a recognized/registered software incident associated with a monitored software application framework, such as a software incident that is determined based on a set of software alert data objects associated with the monitored software application framework. In some embodiments, the software incident data object is associated with a team identifier for a software development/maintenance team that is associated with handling the software incident, a component identifier for a software component of the monitored software application framework that is affected by the software incident, and/or a set of software alert data objects that are associated with the software alert data object based on one or more user annotations about associations between software alert data objects and software incident data objects (e.g., as entered using the Opsgenie® incident management system) and/or based on one or more alert-incident association heuristics.

The term "first-order alert classification machine learning model" refers to a data construct that is generated by a training engine of a software monitoring data management computing device of a software monitoring data management system using training data stored on a training data storage unit of the storage subsystem of the software monitoring data management system. Once generated, the first-order alert classification machine learning model is stored as part of a model configuration data storage unit of the storage subsystem. When invoked, the model execution engine of the software monitoring data management computing device executes operations defined by the first-order alert classification machine learning model with respect to alert attribute data fields of a software alert data object and in accordance with the trained parameters of the first-order alert classification model to generate a first-order alert classification score for the software alert data object. As part of generating the first-order alert classification score for the software alert data object, the first-order alert classification machine learning model generates an alert representation for the software alert data object. The alert representation is a fixed-dimensional representation of the software alert data object that may be generated based on the output of the sub-ultimate layer of the first-order alert classification machine learning model. The first-order alert classification machine learning model is configured to process (e.g., using the ultimate layer of the first-order alert classification machine learning model) the alert representation for the first-order alert classification machine learning model to generate the first-order alert classification score for the software alert data object. In some embodiments, to generate the first-order alert classification machine learning model, the training engine uses training data comprising a set of training data entries. In some embodiments, each training data entry includes: (i) a set of alert attribute data fields for a software alert data object of a monitored software application framework, and (ii) a ground-truth first-order alert classification label that describes whether the software alert relates to at least one software incident data object of the monitored software application framework (e.g., whether the software alert data object is deemed to have caused an incident). In some embodiments, ground-truth classification labels for software alert data objects are generated based on at least one of: (i) user annotations about associations between software alert data objects and software incident data objects of the monitored software application framework (e.g., as entered using the Opsgenie® incident management system), or (ii) alert-incident association heuristics.

The term "first-order alert classification score" refers to a data construct that is generated by a model execution engine of a software monitoring data management computing device and stored as part of a storage subsystem of a software monitoring data management system. The first-order alert classification score describes a computed/predicted likelihood that a corresponding software alert data object is related to at least one software incident data object. The first-order alert classification score is generated by the first-order alert classification machine learning model based on processing the alert attribute data fields associated with the corresponding software alert data object. In some embodiments, because the first-order alert classification machine learning model is trained based on limited training data (e.g., limited training data generated based on user annotations about associations between software alert data objects and software incident data objects and/or based on alert-incident association heuristics), the first-alert classification scores generated by the first-order alert classification machine learning model are not sufficiently reliable. Accordingly, various embodiments of the present invention perform a set of machine-learning-based alert classification score adjustment operations on first-order alert classification scores generated by the first-order alert classification machine learning model in order to generate higher-order alert classification scores that are expected to be more reliable than first-order alert classification scores generated by the first-order alert classification machine learning model.

The term "defined temporal window" refers to a data construct that is generated by a model execution engine of a software monitoring data management computing device and stored as part of a storage subsystem of a software monitoring data management system. The defined temporal window describes a defined period of time associated with a software incident data object and/or a software alert data object. For example, the defined temporal window for a software alert data object describes a period of time that includes X time units (e.g., X hours) before creation time of the software alert data object and Y time units (e.g., Y hours) after creation time of the software alert data object. As another example, the defined temporal window for a software incident data object describes a period of time that includes X time units (e.g., X hours) before creation time of the software incident data object and Y time units (e.g., Y hours) after creation time of the software incident data object. In some embodiments, X may be 2 and Y may be zero. When a given software alert data object occurs within the defined temporal window of a particular software alert data object, the given software alert data object is referred to herein as a "temporal neighbor software alert data object" for the particular software alert data object. In some embodiments, the alert representations for all of the temporal neighbor software alert data objects for a particular software alert data object are processed using a temporal-sequential alert classification machine learning model to generate a temporal-sequential alert classification score for the particular software alert data object.

The term "temporal-sequential alert classification machine learning model" refers to a data construct that is generated by a training engine of a software monitoring data management computing device of a software monitoring data management system using training data stored on a training data storage unit of the storage subsystem of the software monitoring data management system. Once generated, the temporal-sequential alert classification machine learning model is stored as part of a model configuration data storage unit of the storage subsystem. The temporal-sequential alert classification machine learning model is configured to process the alert representations for all of the temporal neighbor software alert data objects of a particular software alert data object (i.e., all of the temporal neighbor alert representations for the temporal neighbor software alert data objects of the particular software alert data object) to generate a temporal-sequential alert classification score for the particular software alert data object. Accordingly, the temporal-sequential alert classification machine learning model is configured to process alert representations for a stream of software alert data objects that are within the defined temporal window of a primary software alert data object in the stream to generate a likelihood that the stream relates to at least one software incident data object. In some embodiments, the temporal-sequential alert classification machine learning model is trained using a set of training data entries. In some embodiments, a training data entry describes feature data associated with a stream of software alert data objects and a ground-truth stream classification label that describes whether the stream is related to at least one software incident data object. In some embodiments, the ground-truth stream classification label for a stream of software alert data objects is an affirmative ground-truth stream classification score if the stream comprises all of the software alert data objects that occur within the defined temporal window of a software incident data object. In some embodiments, the ground-truth stream classification label for a stream of software alert data objects is a negative ground-truth stream classification score if the stream comprises a set of software alert data objects that are randomly sampled without associations with any defined temporal windows of any software incident data objects. In some embodiments, the temporal-sequential alert classification machine learning model comprises: (i) a set of one-dimensional convolutional layers that are configured to generate a convolutional representation of a stream of alert representations, (ii) a one-dimensional max-pooling layer that is configured to process the convolutional representation to generate a max-pooled representation that is generated by introducing shift invariance and scale invariance with respect to the convolutional representation, (iv) a flattening layer that is configured to process the max-pooled representation to generate a flattened representation, and (v) a set of dense neural network layers that are configured to process the flattened representation to generate the temporal-sequential alert classification score.

The term "temporal-sequential alert classification score" refers to a data construct that is generated by a model execution engine of a software monitoring data management computing device and stored as part of a storage subsystem of a software monitoring data management system. The temporal-sequential alert classification score for a software alert data object describes a predicted/computed likelihood that the software alert data object is related to at least one software incident data object of a corresponding monitored software application framework. The predicted/computed likelihood is determined based on features of not just the software alert data object itself, but also based on a stream of software alert data objects whose creation times are within the defined temporal window of the particular software alert data object. The temporal-sequential alert classification score for a software alert data object is generated via processing the temporal neighbor alert representations for temporal neighbor software alert data objects for the particular software alert data object using a temporal-sequential alert classification machine learning model.

The term "encoder attention window" refers to a data construct that is generated by a model execution engine of a software monitoring data management computing device and stored as part of a storage subsystem of a software monitoring data management system. The encoder attention window for a software alert data object describes the combination of: (i) the software alert data object, and (ii) X software alert data objects that occur before the software alert data object and Y software alert data objects that occur after the software alert data object in a defined sequence of software alert data objects for a monitored software application framework (e.g., a sequence defined based on a temporal order of creation times of the software alert data objects of the monitored software alert data object). The software alert data objects that are within the encoder attention window of a particular software alert data object are referred to herein as the "attention neighbor software alert data objects" of the particular software alert data object. In some embodiments, attention-based feature sets for attention neighbor software alert data objects of a particular software alert data object (i.e., attention neighbor alert attention-based feature sets for the attention neighbor software alert data objects of the particular software alert data object) are processed by an attention-based alert classification machine learning framework to generate an attention-based alert classification for the particular software alert data object.

The term "attention-based alert classification machine learning framework" refers to a data construct that is generated by a training engine of a software monitoring data management computing device of a software monitoring data management system using training data stored on a training data storage unit of the storage subsystem of the software monitoring data management system. Once generated, the attention-based alert classification machine learning framework is stored as part of a model configuration data storage unit of the storage subsystem. The attention-based alert classification machine learning model is configured to process attention neighbor attention-based feature sets for attention neighbor software alert data objects of a particular software alert data object to generate an attention-based alert classification score for the particular software alert data object. In some embodiments, the attention-based alert classification machine learning framework comprises: (i) an attention-based encoder machine learning model that is configured to process the attention neighbor attention-based feature sets for the attention neighbor software alert data objects of the particular software alert data object to generate to generate an attention-based alert encoding for the software alert data object, and (ii) an encoder alert classification machine learning model that is configured to process the attention-based alert encoding to generate the attention-based alert classification score for the particular software alert data object.

The term "attention-based encoder machine learning model" is a component of the attention-based alert classification machine learning framework that is configured to process attention neighbor attention-based feature sets for the attention neighbor software alert data objects for a particular software alert data object to generate an attention-based alert encoding for the particular software alert data object. In some embodiments, inputs to the attention-based encoder machine learning model include, for each attention neighbor software alert data object that is in the encoder attention window for the particular software alert data object, an attention neighbor feature set for the attention neighbor software alert data object that includes the alert representation for the attention neighbor software alert data object that is generated via processing the attention neighbor software alert data object using a first-order alert classification machine learning model. In some embodiments, inputs to the attention-based encoder machine learning model include, for each attention neighbor software alert data object that is in the encoder attention window for the particular software alert data object, a positional embedding for the attention neighbor software alert data object that is determined based on a position of the attention neighbor software alert data object in a defined sequence of software alert data objects associated with a corresponding software application framework. In some embodiments, the attention-based encoder machine learning model comprises an encoder attention block that is configured to process the attention neighbor attention-based feature sets for the attention neighbor software alert data objects of a particular software alert data object and positional embeddings for the attention neighbor software alert data objects of the particular software alert data object to generate the attention-based alert encoding for the particular software alert data object. In some embodiments, the attention-based encoder machine learning model is trained as part of an encoder-decoder machine learning framework that comprises the attention-based encoder machine learning model and an attention-based decoder machine learning model.

The term "encoder-based alert classification machine learning model" is a component of the attention-based alert classification machine learning model that is configured to process the attention-based alert encoding for a particular software alert data object to generate an attention-based alert classification score for the particular software alert data object. In some embodiments, the encoder-based classification model comprises one or more dense neural network machine learning models. In some embodiments, to generate the encoder-based alert classification machine learning model, the training engine uses training data comprising a set of training data entries. In some embodiments, each training data entry includes: (i) attention neighbor attention-based feature sets for attention neighbor software alert data objects that are in the encoder attention window of a particular software alert data object, and (ii) a ground-truth first-order alert classification label that describes whether the software alert data object relates to at least one software incident data object of the monitored software application framework (e.g., whether the software alert data object is deemed to have caused an incident). In some embodiments, ground-truth classification labels for software alert data objects are generated based on at least one of: (i) user annotations about associations between software alert data objects and software incident data objects of the monitored software application framework (e.g., as entered using the Opsgenie® incident management system), or (ii) alert-incident association heuristics.

The term "encoder-decoder machine learning framework" refers to a data construct that is generated by a training engine of a software monitoring data management computing device of a software monitoring data management system using training data stored on a training data storage unit of the storage subsystem of the software monitoring data management system. Once generated, the encoder-decoder machine learning framework is stored as part of a model configuration data storage unit of the storage subsystem. The encoder-decoder machine learning framework comprises an attention-based encoder machine learning model and an attention-based decoder machine learning model. In some embodiments, the encoder-decoder machine learning framework further comprises an intermediate attention block. In some embodiments, during training of the attention-based encoder machine learning model, the attention-based decoder machine learning model is configured to process the output of the attention-based encoder machine learning model and/or the output of the intermediate attention block that is obtained via processing the attention neighbor attention-based feature sets for attention neighbor software alert data objects of a training software alert data object to generate reconstructed attention neighbor attention-based feature sets for the attention neighbor software alert data objects. In some embodiments, trained parameters of the encoder-decoder machine learning framework are then updated based on a deviation measure of the attention-neighbor attention-based feature sets and the reconstructed attention-based feature sets. In some embodiments, to generate reconstructed attention neighbor attention-based feature sets for attention neighbor software alert data objects of a training software alert data object, the encoder-decoder machine learning framework performs the following operations: (i) processing the attention neighbor attention-based feature sets using the attention-based encoder machine learning model to generate an attention-based alert encoding for the training software alert data object, (ii) processing the attention-based alert encodings for the attention neighbor software alert data objects of the training software alert data object using the intermediate attention block to generate the refined attention-based alert encoding for the training software alert data object, and (iii) processing the refined attention-based alert encoding for the attention neighbor software alert data objects of the training software alert data object to generate reconstructed attention-based feature set for the training software alert data object.

The term "grouping category" refers to a data construct that is generated by a model execution engine of a software monitoring data management computing device and stored as part of a storage subsystem of a software monitoring data management system. A grouping category is any attribute based on which a set of software alert data objects can be divided into a set of groups. Examples of grouping categories include team identifiers of software alert data objects, such that a set of software alert data objects can be divided into a set of team-based groups each comprising a subset of software alert data objects that are associated with a common team identifier. Other examples of grouping categories include days of the week, such that a set of software alert data objects can be divided into a set of groupings each comprising a subset of the software alert data objects whose creation times are associated with a common day of the week. In some embodiments, given a particular software alert data object, those software alert data objects that both occur within a defined temporal window of the particular software alert data object and are associated with a target grouping category of the particular software alert data object are referred to as the categorical neighbor software alert data objects of the particular software alert data object. For example, if the target grouping category relates to the team identifier of the particular software alert data object, the categorical neighbor software alert data objects for the particular software alert data object may include those software alert data objects that are in the defined temporal window of the particular software alert data object and are associated with the team identifier of the particular software alert data object.

The term "categorical-sequential alert classification machine learning model" refers to a data construct that is generated by a training engine of a software monitoring data management computing device of a software monitoring data management system using training data stored on a training data storage unit of the storage subsystem of the software monitoring data management system. Once generated, the categorical-sequential alert classification machine learning model is stored as part of a model configuration data storage unit of the storage subsystem. The categorical-sequential alert classification machine learning model is configured to process alert representations of categorical neighbor software alert data objects of a particular software alert data object (i.e., categorical neighbor alert representations for the categorical neighbor software alert data objects of the particular software alert data object) to generate a categorical-sequential alert classification score for the particular software alert data object. In some embodiments, the categorical-sequential alert classification machine learning model is configured to process alert representations for a stream of software alert data objects that are within the defined temporal window of a primary software alert data object in the stream and are associated with a target grouping category of the primary software alert data object to generate a likelihood that the stream relates to at least one software incident data object. In some embodiments, the categorical-sequential alert classification machine learning model is trained using a set of training data entries. In some embodiments, a training data entry describes feature data associated with a stream of software alert data objects and a ground-truth stream classification label that describes whether the stream is related to at least one software incident data object. In some embodiments, the ground-truth stream classification label for a stream of software alert data objects is an affirmative ground-truth stream classification score if the stream comprises all of the software alert data objects that occur within the defined temporal window of a software incident data object and are associated with a team identifier for the software incident data object. In some embodiments, the ground-truth stream classification label for a stream of software alert data objects is a negative ground-truth stream classification score if the stream comprises a set of software alert data objects that are randomly sampled without associations with any defined temporal windows of any software incident data objects and/or without associations with team identifiers of any software incident data objects. In some embodiments, the categorical-sequential alert classification machine learning model comprises: (i) a set of one-dimensional convolutional layers that are configured to generate a convolutional representation of a stream of alert representations, (ii) a one-dimensional max-pooling layer that is configured to process the convolutional representation to generate a max-pooled representation that is generated by introducing shift invariance and scale invariance with respect to the convolutional representation, (iv) a flattening layer that is configured to process the max-pooled representation to generate a flattened representation, and (v) a set of dense neural network layers that are configured to process the flattened representation to generate the categorical-sequential alert classification score.

The term "categorical-sequential alert classification score" refers to a data construct that is generated by a model execution engine of a software monitoring data management computing device and stored as part of a storage subsystem of a software monitoring data management system. The categorical-sequential alert classification score for a software alert data object describes a predicted/computed likelihood that the software alert data object is related to at least one software incident data object of a corresponding monitored software application framework. The predicted/computed likelihood is determined based on features of not just the software alert data object itself, but also based on a stream of software alert data objects whose creation times are within the defined temporal window of the particular software alert data object and are associated with a target grouping category (e.g., a team identifier) of the particular software alert data object. The categorical-sequential alert classification score for a software alert data object is generated via processing the categorical neighbor alert representations for categorical neighbor software alert data objects for the particular software alert data object using a categorical-sequential alert classification machine learning model. In some embodiments, when generating the categorical-sequential alert classification score for a particular software alert data object, the inputs to the categorical-sequential alert classification machine learning model include categorical neighbor alert representations for the categorical neighbor software alert data objects of the particular software alert data object, categorical neighbor software alert data objects for the particular software alert data object, a priority distribution of the categorical neighbor software alert data objects for the particular software alert data object (e.g., a priority distribution describing that 10 percent of the categorical neighbor software alert data objects are associated with a P1 priority level, 20 percent of the categorical neighbor software alert data objects are associated with a P2 priority level, and so on), average inter-arrival time of software alert data objects in the stream comprising the categorical neighbor software alert data objects for the particular software alert data object, and/or text embeddings of natural language data fields of the categorical neighbor software alert data objects for the particular software alert data object.

The term "alert clustering machine learning model" refers to a data construct that describes data stored as part of a model configuration data storage unit of a storage subsystem of a software monitoring data management system. The data construct describes defined operations of a clustering machine learning model that is configured to process alert feature sets for a set of software alert data objects to generate a set of alert clusters, where each alert cluster includes a subset of the software alert data objects that are deemed to be related. Examples of alert clustering machine learning models include alert clustering machine learning models that include at least one of a k-means clustering algorithm, a density-based spatial clustering of applications (DBSCAN) clustering algorithm, an agglomerative clustering algorithm, an affinity propagation clustering algorithm, and/or the like. In some embodiments, once generated, the following features are generated for an alert cluster: (i) an alert count for the alert cluster, (ii) a priority distribution for the alert cluster, or (iii) an inter-alert arrival time distribution for the alert cluster. In some embodiments, an alert feature set for a software alert data object describes at least one of alert attribute data fields of the software alert data object and/or an embedded representation of a natural language format field (e.g., an alert message field) of the software alert data object, such as an embedded representation generated based on the output of processing the alert message field of the software alert data object using a text encoder machine learning model such as the Google's Universal Sentence Encoder.

The term "alert signature" refers to a data construct that is generated by a model execution engine of a software monitoring data management computing device and stored as part of a storage subsystem of a software monitoring data management system. The alert signature of a software alert data object describes a set of alert classification scores for the software alert data object, where each alert classification score describes a computed/predicted likelihood that the software alert data object is related to at least one software incident data object of a corresponding monitored software application framework. For example, the alert signature for a software alert data object may be determined based on at least one of the first-order alert classification scores for the software alert data object, temporal-sequential alert classification score for the software alert data object, one or more categorical-sequential alert classification scores for the software alert data object, the attention-based alert classification score for the software alert data object, and/or the like. In some embodiments, the alert signature for a software alert data object is processed by a second-order alert classification machine learning model to generate a second-order alert classification score for the software alert data object.

The term "attention-based alert classification score" refers to a data construct that is generated by a model execution engine of a software monitoring data management computing device and stored as part of a storage subsystem of a software monitoring data management system. The attention-based alert classification score describes a computed/predicted likelihood that a corresponding software alert data object is related to at least one software incident data object. The attention-based alert classification score is generated by the attention-based alert classification machine learning model based on processing attention neighbor attention-based feature sets for attention neighbor software alert data objects that are in the encoder attention window of the particular software alert data object.

Example System Architecture

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

Figure 1:
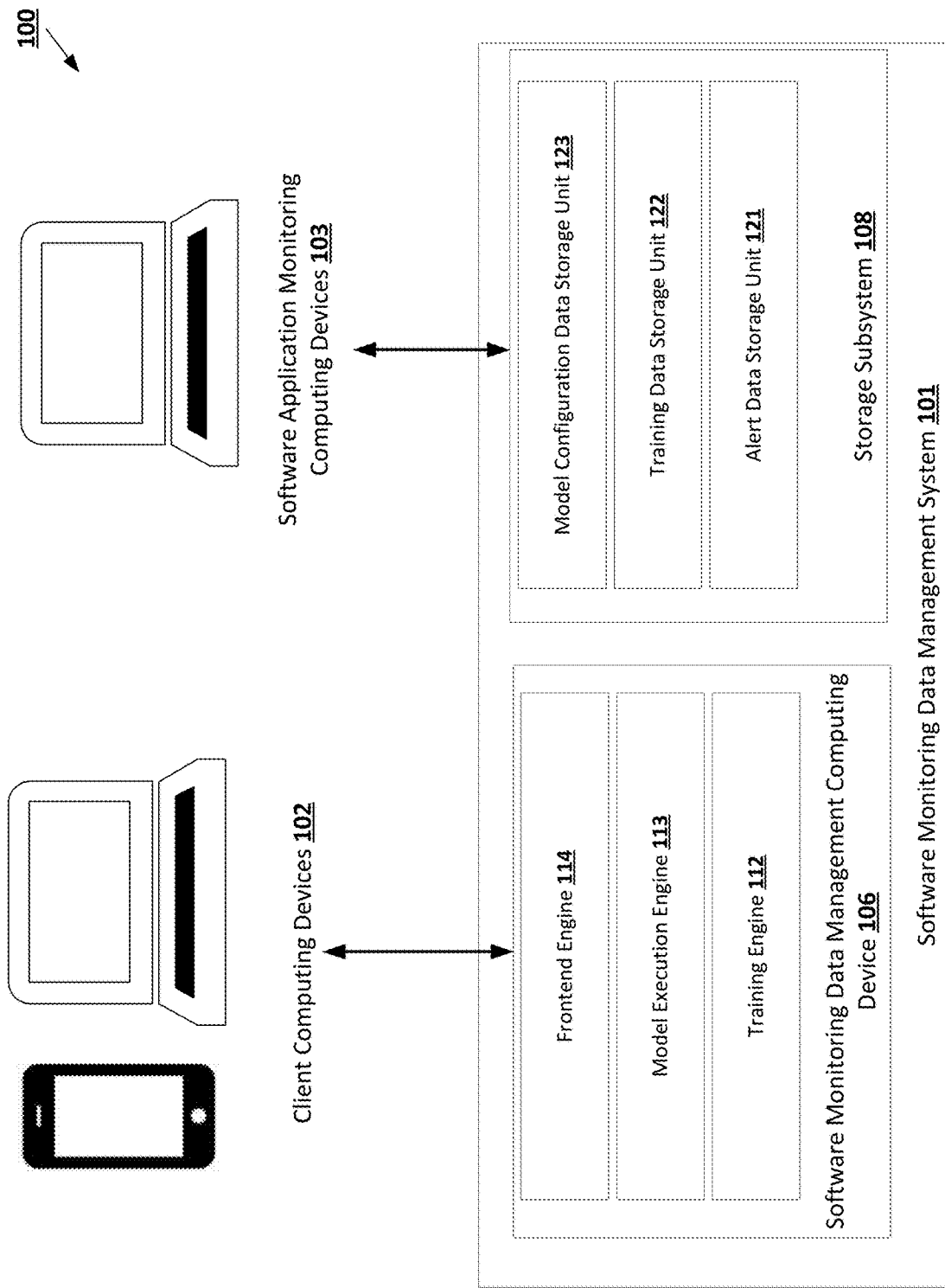
FIG. 1 is a block diagram of an example architecture within which at least some embodiments of the present invention may operate.

FIG. 1 depicts an exemplary architecture 100 for performing predictive monitoring of a software application framework that is associated with one or more software application monitoring computing devices 103. The architecture 100 includes one or more client computing devices 102, a software monitoring data management system 101, and the one or more software application monitoring computing devices 103.

The one or more software application monitoring computing devices 103 are configured to transmit software alert data objects to the software monitoring data management system 101, which the software monitoring data management system 101 may store in the alert data storage unit 121 in the storage subsystem 108 of the software monitoring data management system 101. The software monitoring data management computing device 106 may generate, using the training engine 112, one or more machine learning models based on training data stored in a training data storage unit 122. The software monitoring data management computing device 106 may further process, using a model execution engine 113, the software alert data objects that are stored in the alert data storage unit 121 using the model configuration data that are stored in the model configuration data storage unit 123 in the storage subsystem 108 of the software monitoring data management system 101 in order to generate prediction outputs that are transmitted to the client computing devices 102 via a frontend engine 114 of the software monitoring data management computing device 106.

The client computing devices 102, the software application monitoring computing devices 103, and the software monitoring data management computing device 106 may communicate over one or more networks. A network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, a network may include a cellular telephone, an 802.11, 802.16, 802.20, and/or WiMax network. Further, a network may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the page management system. In some embodiments, the protocol is a custom protocol of JavaScript Object Notation (JSON) objects sent via a Websocket channel. In some embodiments, the protocol is JSON over RPC, JSON over REST/HTTP, and the like.

Exemplary Software Monitoring Data Management Computing Device

Figure 2:
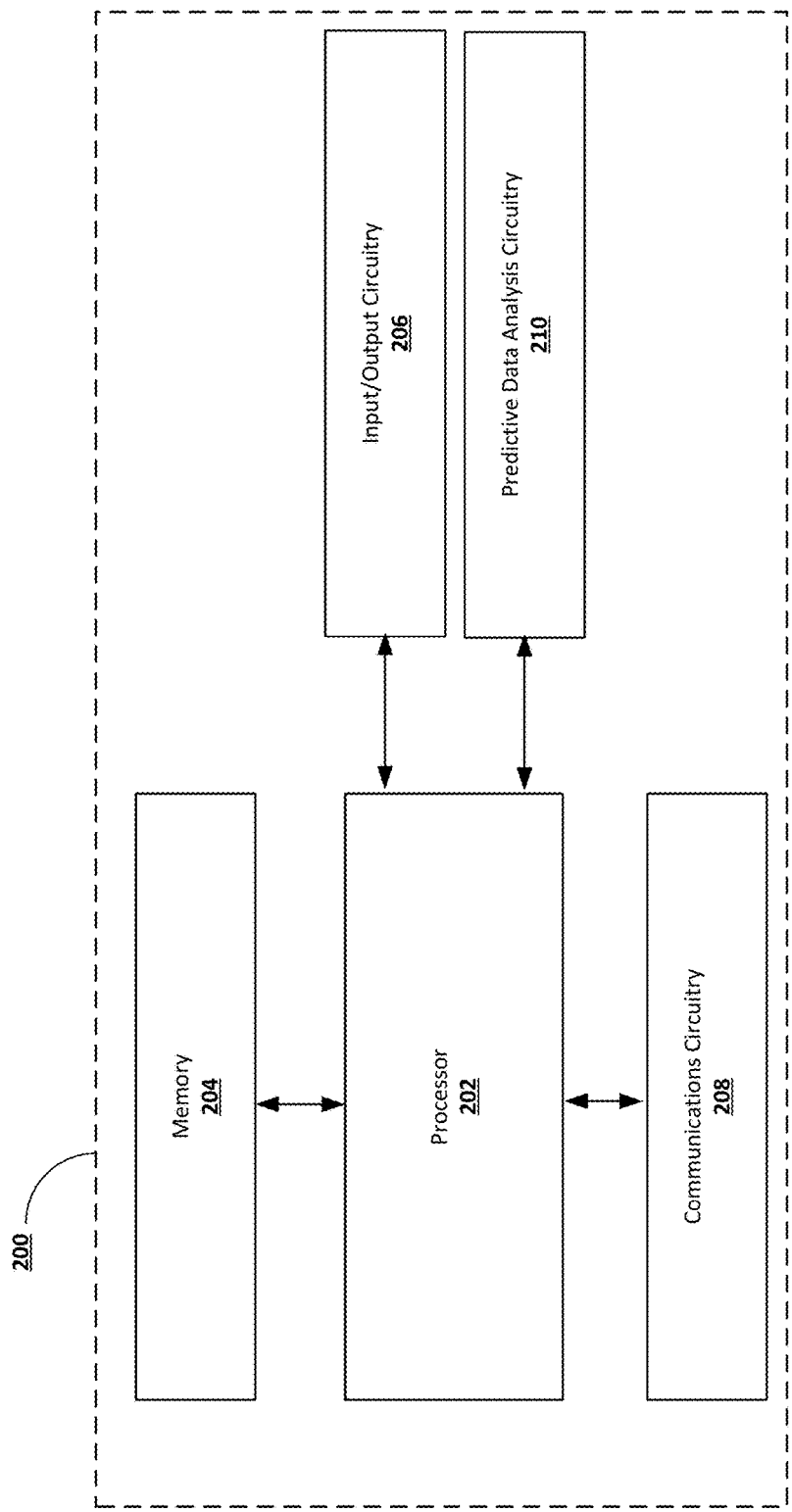
FIG. 2 is a block diagram of an example software monitoring data management computing device in accordance with at least some embodiments of the present invention.

The software monitoring data management computing device 106 may be embodied by one or more computing systems, such as apparatus 200 shown in FIG. 2. The apparatus 200 may include processor 202, memory 204, input/output circuitry 206, communications circuitry 208, and a predictive data analysis circuitry 210. The apparatus 200 may be configured to execute the operations described herein. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

The predictive data analysis circuitry 210 may be any means such as a device or circuitry embodied in either hardware or a combination of hardware and software that is configured to perform predictive data analysis operations. For example, the predictive data analysis circuitry 210 may include specialized circuitry that is configured to perform machine learning operations in an expedited manner, such as graphical processing unit (GPU) circuitry and/or tensor processing unit (TPU) circuitry.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Exemplary Client Computing Device

Figure 3:
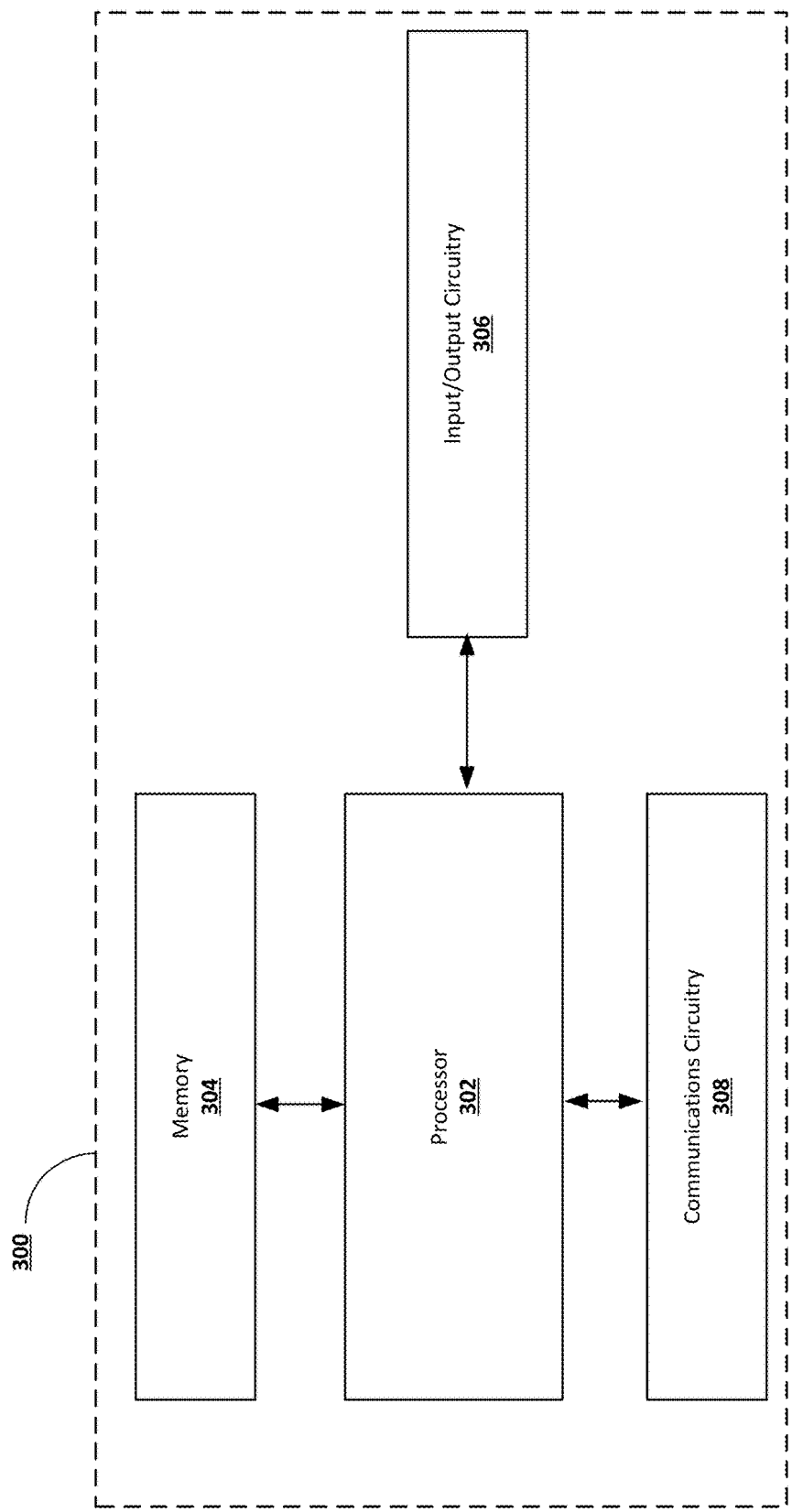
FIG. 3 is a block diagram of an example client computing device in accordance with at least some embodiments of the present invention.

Referring now to FIG. 3, a client computing device may be embodied by one or more computing systems, such as apparatus 300 shown in FIG. 3. The apparatus 300 may include processor 302, memory 304, input/output circuitry 306, and a communications circuitry 308. Although these components 302-308 are described with respect to functional limitations, it should be understood that the particular implementations necessarily include the use of particular hardware. It should also be understood that certain of these components 302-308 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present invention.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a query-initiating computing device, a kiosk, or the like.

In embodiments in which the apparatus 300 is embodied by a limited interaction device, the input/output circuitry 306 includes a touch screen and does not include, or at least does not operatively engage (i.e., when configured in a table mode), other input accessories such as tactile keyboards, track pads, mice, etc. In other embodiments in which the apparatus is embodied by a non-limited interaction device, the input/output circuitry 306 may include at least one of a tactile keyboard (e.g., also referred to herein as keypad), a mouse, a joystick, a touch screen, touch areas, soft keys, and other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means, such as a device or circuitry embodied in either hardware or a combination of hardware and software, that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communications circuitry 308 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Exemplary Software Application Monitoring Computing Device

Figure 4:
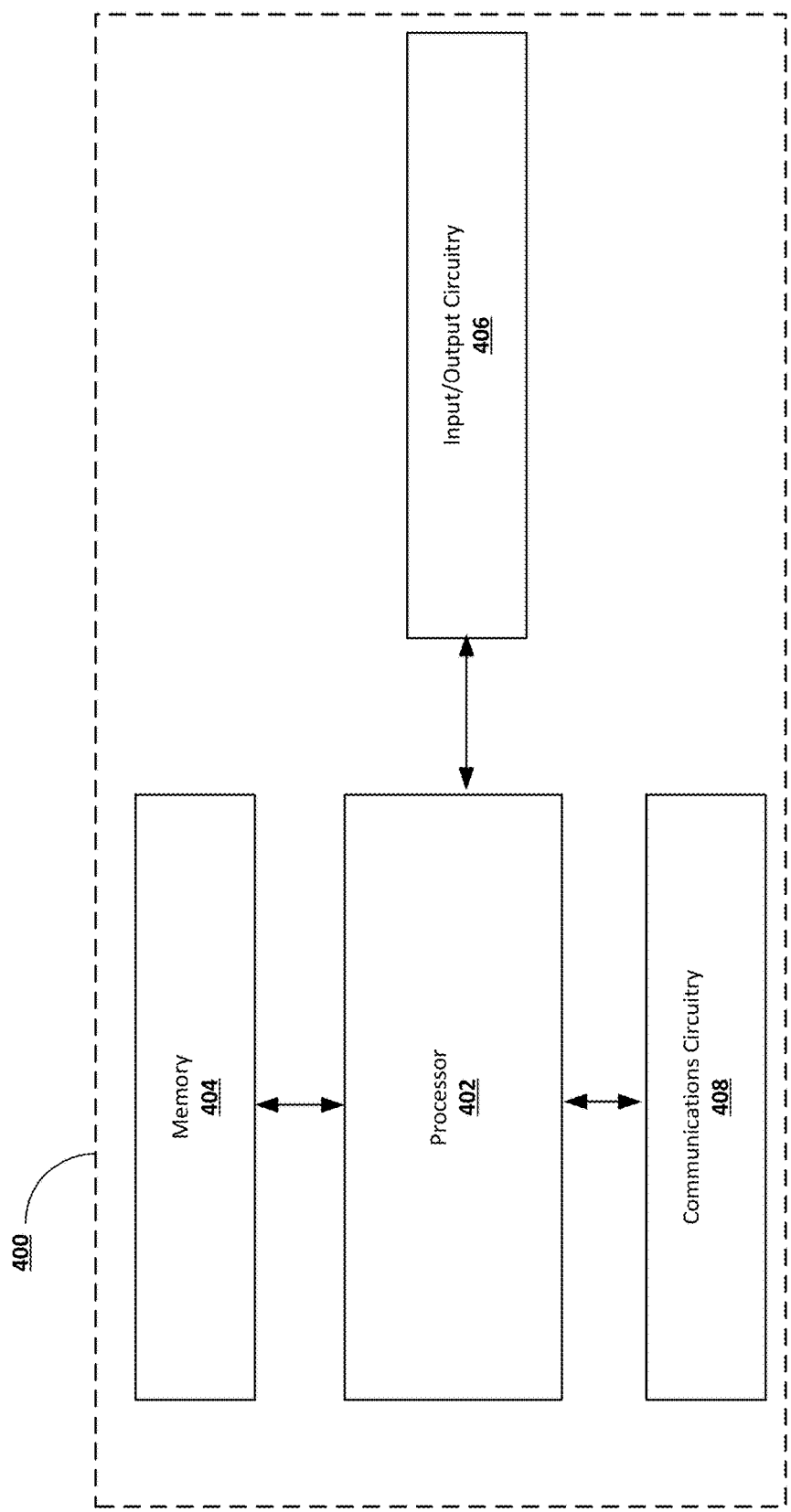
FIG. 4 is a block diagram of an example software application monitoring computing device in accordance with at least some embodiments of the present invention.

Referring now to FIG. 4, a software application monitoring computing device may be embodied by one or more computing systems, such as apparatus 400 shown in FIG. 4. The apparatus 400 may include processor 402, memory 404, input/output circuitry 406, and communications circuitry 408. Although these components 402-408 are described with respect to functional limitations, it should be understood that the particular implementations necessarily include the use of particular hardware. It should also be understood that certain of these components 402-408 may include similar or common hardware. For example, two sets of circuitries may both leverage use of the same processor, network interface, storage medium, or the like to perform their associated functions, such that duplicate hardware is not required for each set of circuitries.

In some embodiments, the processor 402 (and/or co-processor or any other processing circuitry assisting or otherwise associated with the processor) may be in communication with the memory 404 via a bus for passing information among components of the apparatus. The memory 404 is non-transitory and may include, for example, one or more volatile and/or non-volatile memories. In other words, for example, the memory 404 may be an electronic storage device (e.g., a computer-readable storage medium). The memory 404 may include one or more databases. Furthermore, the memory 404 may be configured to store information, data, content, applications, instructions, or the like for enabling the apparatus 400 to carry out various functions in accordance with example embodiments of the present invention.

The processor 402 may be embodied in a number of different ways and may, for example, include one or more processing devices configured to perform independently. In some preferred and non-limiting embodiments, the processor 402 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 402 may be configured to execute instructions stored in the memory 404 or otherwise accessible to the processor 402. In some preferred and non-limiting embodiments, the processor 402 may be configured to execute hard-coded functionalities. As such, whether configured by hardware or software methods, or by a combination thereof, the processor 402 may represent an entity (e.g., physically embodied in circuitry) capable of performing operations according to an embodiment of the present invention while configured accordingly. Alternatively, as another example, when the processor 402 is embodied as an executor of software instructions (e.g., computer program instructions), the instructions may specifically configure the processor 402 to perform the algorithms and/or operations described herein when the instructions are executed.

In some embodiments, the apparatus 400 may include input/output circuitry 406 that may, in turn, be in communication with processor 402 to provide output to the user and, in some embodiments, to receive an indication of a user input. The input/output circuitry 406 may comprise a user interface and may include a display, and may comprise a web user interface, a mobile application, a query-initiating computing device, a kiosk, or the like.

In embodiments in which the apparatus 400 is embodied by a limited interaction device, the input/output circuitry 406 includes a touch screen and does not include, or at least does not operatively engage (i.e., when configured in a table mode), other input accessories such as tactile keyboards, track pads, mice, etc. In other embodiments in which the apparatus is embodied by a non-limited interaction device, the input/output circuitry 406 may include at least one of a tactile keyboard (e.g., also referred to herein as keypad), a mouse, a joystick, a touch screen, touch areas, soft keys, and other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 404, and/or the like).

The communications circuitry 408 may be any means, such as a device or circuitry embodied in either hardware or a combination of hardware and software, that is configured to receive and/or transmit data from/to a network and/or any other device, circuitry, or module in communication with the apparatus 400. In this regard, the communications circuitry 408 may include, for example, a network interface for enabling communications with a wired or wireless communication network. For example, the communications circuitry 408 may include one or more network interface cards, antennae, buses, switches, routers, modems, and supporting hardware and/or software, or any other device suitable for enabling communications via a network. Additionally or alternatively, the communications circuitry 408 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 400. In some embodiments, one or more external systems (such as a remote cloud computing and/or data storage system) may also be leveraged to provide at least some of the functionality discussed herein.

Example Data Flows and Operations

As described below, to address various challenges related to monitoring complex software application frameworks, various embodiments of the present invention describe techniques for generating alert signatures for software alert data objects of a complex software application framework that are determined based on at least one of first-order alert classification scores for the software alert data objects, temporal-sequential alert classification scores for the software alert data objects, categorical-sequential alert classification scores for the software alert data objects, attention-based alert classification scores for the software alert data objects, and second-order alert classification scores for the software alert data object. In some embodiments, alert representations for software alert data objects generated using a first-order alert classification machine learning model (e.g., a binary alert classifier machine learning model) are grouped across defined temporal windows and/or across grouping categories (e.g., across subsets of software alert data objects that are associated with common team identifiers) to generate sequential alert classification scores that are then merged with attention-based alert classification scores generated using self-attention mechanism applied to encoder attention windows for software alert data objects to generate alert classification scores. The alert classification scores can, once generated, be used to perform one or more incident management operations/actions with respect to a monitored software application framework.

Figure 5:
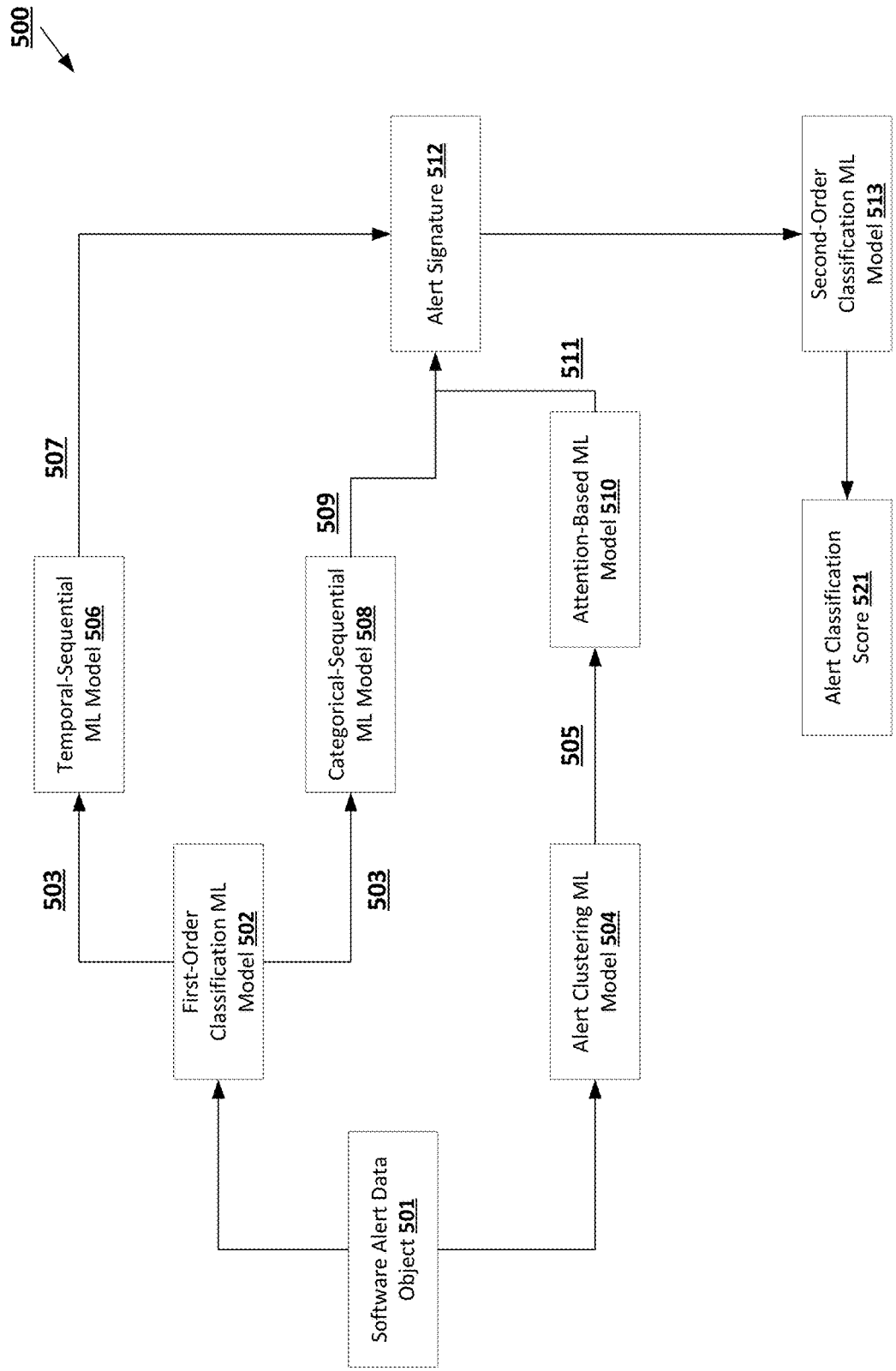
FIG. 5 is a data flow diagram of an example process for generating an alert classification score for a software alert data object in accordance with at least some embodiments of the present invention.

FIG. 5 is a data flow diagram of an example process 500 for generating an alert classification score 521 for a software alert data object 501. Via the various steps/operations of the process 500, the software monitoring data management computing device 106 processes alert attribute data fields of a software alert data object 501 using a set of machine learning models to generate the alert classification score 421 for the software alert data object.

As described above, the inputs to the process 500 include a software alert data object 501 that describes alert attribute data fields of a corresponding software alert. Examples of alert attribute data fields of a software alert data object 501 include one or more numerical attribute data fields, such as a numerical attribute data field describing the deduplication count of the software alert data object 501, a numerical attribute data field describing the number of other software alert data objects created during a 15-minute window around the creation time of the software alert data object 501, a numerical attribute data field describing the number of nth priority level software alert data objects created during a 15-minute window around the creation time of the software alert data object 501 (where n may iterate over the range of software alert data object priority levels), an average inter-arrival time of software alert data objects at the creation time of the software alert data object 501, and/or the like. Other examples of alert attribute data fields of a software alert data object 501 include one or more categorical attribute data fields, such as a categorical attribute data field describing the priority level of the software alert data object 501 (e.g., describing whether the software alert data object is P1, P2, P3, P4, or P5), a categorical attribute data field describing the alert source of the software alert data object 501 (e.g., describing whether the software alert data object is user-initiated, system-initiated, request-initiated, and/or the like), a categorical attribute data field describing whether the creation time of the software alert data object 501 is a weekend or a weekday, and/or the like. Other examples of alert attribute data fields for a software alert data object 501 include an embedded representation of a natural language format field (e.g., an alert message field) of the software alert data object 501, such as an embedded representation generated based on the output of processing the alert message field of the software alert data object 501 using a text encoder machine learning model such as the Google's Universal Sentence Encoder.

The process 500 begins when a first-order alert classification machine learning model 502 processes the alert attribute data fields of the software alert data object 501 to generate an alert representation 503 for the software alert data object 501. In some embodiments, the first-order alert classification machine learning model 502 is configured to generate a first-order alert classification score for the software alert data object 501. As part of generating the first-order alert classification score for the software alert data object 501, the first-order alert classification machine learning model generates an alert representation 503 for the software alert data object 501. The alert representation 503 is a fixed-dimensional representation of the software alert data object 501 that may be generated based on the output of the sub-ultimate layer of the first-order alert classification machine learning model 502. The first-order alert classification machine learning model 502 is configured to process (e.g., using the ultimate layer of the first-order alert classification machine learning model 502) the alert representation 503 for the first-order alert classification machine learning model 502 to generate the first-order alert classification score for the software alert data object.

In some embodiments, to generate the first-order alert classification machine learning model, the training engine 112 uses training data stored on the training data storage unit 122 that comprises a set of training data entries. In some embodiments, each training data entry includes: (i) a set of alert attribute data fields for a software alert data object of a monitored software application framework, and (ii) a ground-truth first-order alert classification label that describes whether the software alert relates to at least one software incident data object of the monitored software application framework (e.g., whether the software alert data object is deemed to have caused an incident). In some embodiments, ground-truth classification labels for software alert data objects are generated based on at least one of: (i) user annotations about associations between software alert data objects and software incident data objects of the monitored software application framework (e.g., as entered using the Opsgenie® incident management system), or (ii) alert-incident association heuristics.

As described above, the first-order alert classification machine learning model 502 is configured to generate a first-order alert classification score for the software alert data object 501. The first-order alert classification score describes a computed/predicted likelihood that a corresponding software alert data object is related to at least one software incident data object. The first-order alert classification score is generated by the first-order alert classification machine learning model based on processing the alert attribute data fields associated with the corresponding software alert data object. In some embodiments, because the first-order alert classification machine learning model is trained based on limited training data (e.g., limited training data generated based on user annotations about associations between software alert data objects and software incident data objects and/or based on alert-incident association heuristics), the first-alert classification scores generated by the first-order alert classification machine learning model are not sufficiently reliable. Accordingly, various embodiments of the present invention perform a set of machine-learning-based alert classification score adjustment operations on first-order alert classification scores generated by the first-order alert classification machine learning model in order to generate higher-order alert classification scores that are expected to be more reliable than first-order alert classification scores generated by the first-order alert classification machine learning model.

The process 500 continues when an alert clustering machine learning model 504 processes the alert attribute data fields of the software alert data object 501 to generate an alert cluster 505 for the software alert data object 501. In some embodiments, the alert clustering machine learning model 504 processes alert feature sets for a set of software alert data objects to generate a set of alert clusters, where each alert cluster includes a subset of the software alert data objects that are deemed to be related. Examples of alert clustering machine learning models include alert clustering machine learning models that include at least one of a k-means clustering algorithm, a density-based spatial clustering of applications (DBSCAN) clustering algorithm, an agglomerative clustering algorithm, an affinity propagation clustering algorithm, and/or the like. In some embodiments, once generated, the following features are generated for an alert cluster: (i) an alert count for the alert cluster, (ii) a priority distribution for the alert cluster, or (iii) an inter-alert arrival time distribution for the alert cluster. In some embodiments, an alert feature set for a software alert data object describes at least one of an alert attribute data field of the software alert data object and/or an embedded representation of a natural language format field (e.g., an alert message field) of the software alert data object, such as an embedded representation generated based on the output of processing the alert message field of the software alert data object using a text encoder machine learning model such as the Google's Universal Sentence Encoder.

In some embodiments, the alert cluster for a software alert data object describes a set of software alert data objects that are determined to be related to the software alert data object. In some embodiments, each alert cluster is associated with an alert count that describes a number of software alert data objects that are in the alert cluster. In some embodiments, each alert cluster is associated with a priority distribution that describes, for each priority level of a set of priority levels, a ratio of the software alert data objects in the alert cluster that are associated with the noted priority level. In some embodiments, each cluster is associated with an inter-alert arrival time distribution that describes a distribution of time delays between consecutive software alert data objects in a sequence of software alert data objects in the alert cluster that is determined based on creation times of the software alert data objects in the alert cluster. In some embodiments, once detected, the alert cluster of a software alert data object is used to generate clustering metadata for the software alert data object that may be used to perform incident management operations with respect to the software alert data object.

The process 500 continues when temporal neighbor alert representations for the temporal neighbor software alert data objects of the software alert data object 501 that are in a defined temporal window of the software alert data object are processed using a temporal-sequential alert classification machine learning model 506 to generate a temporal-sequential alert classification score 507 for the software alert data object. The defined temporal window for the software alert data object 501 describes a period of time that includes X time units (e.g., X hours) before creation time of the software alert data object 501 and Y time units (e.g., Y hours) after creation time of the software alert data object 501. In some embodiments, X may be 2 and Y may be zero. When a given software alert data object occurs within the defined temporal window of a particular software alert data object, the given software alert data object is referred to herein as a "temporal neighbor software alert data object" for the particular software alert data object. In some embodiments, the alert representations for all of the temporal neighbor software alert data objects for a particular software alert data object are processed using a temporal-sequential alert classification machine learning model to generate a temporal-sequential alert classification score for the particular software alert data object.

The temporal-sequential alert classification machine learning model 506 is configured to process the alert representations for all of the temporal neighbor software alert data objects of a particular software alert data object (i.e., all of the temporal neighbor alert representations for the temporal neighbor software alert data objects of the particular software alert data object) to generate a temporal-sequential alert classification score for the particular software alert data object. Accordingly, the temporal-sequential alert classification machine learning model is configured to process alert representations for a stream of software alert data objects that are within the defined temporal window of a primary software alert data object in the stream to generate a likelihood that the stream relates to at least one software incident data object.

In some embodiments, the temporal-sequential alert classification machine learning model 506 is trained using a set of training data entries. In some embodiments, a training data entry describes feature data associated with a stream of software alert data objects and a ground-truth stream classification label that describes whether the stream is related to at least one software incident data object. In some embodiments, the ground-truth stream classification label for a stream of software alert data objects is an affirmative ground-truth stream classification score if the stream comprises all of the software alert data objects that occur within the defined temporal window of a software incident data object. In some embodiments, the ground-truth stream classification label for a stream of software alert data objects is a negative ground-truth stream classification score if the stream comprises a set of software alert data objects that are randomly sampled without associations with any defined temporal windows of any software incident data objects.

In some embodiments, the temporal-sequential alert classification machine learning model 506 comprises: (i) a set of one-dimensional convolutional layers that are configured to generate a convolutional representation of a stream of alert representations, (ii) a one-dimensional max-pooling layer that is configured to process the convolutional representation to generate a max-pooled representation that is generated by introducing shift invariance and scale invariance with respect to the convolutional representation, (iv) a flattening layer that is configured to process the max-pooled representation to generate a flattened representation, and (v) a set of dense neural network layers that are configured to process the flattened representation to generate the temporal-sequential alert classification score.

The temporal-sequential alert classification score 507 for a software alert data object describes a predicted/computed likelihood that the software alert data object is related to at least one software incident data object of a corresponding monitored software application framework. The predicted/computed likelihood is determined based on features of not just the software alert data object itself, but also based on a stream of software alert data objects whose creation times are within the defined temporal window of the particular software alert data object. The temporal-sequential alert classification score for a software alert data object is generated via processing the temporal neighbor alert representations for temporal neighbor software alert data objects for the particular software alert data object using a temporal-sequential alert classification machine learning model.

In some embodiments, the temporal-sequential alert classification machine learning model 506 has the architecture that is depicted in FIG. 6. As depicted in FIG. 6, the temporal-sequential alert classification machine learning model 506 comprises a set of convolutional layers 601 that are configured to generate a convolutional representation of a stream of software alert data objects. As described above, the stream of software alert data objects comprise the temporal neighbor software alert data objects of the software alert data object 401 that are in the defined temporal window of the software alert data object 401. As further depicted in FIG. 6, the temporal-sequential alert classification machine learning model 506 comprises a one-dimensional max-pooling layer 602 that is configured to process the convolutional representation to generate a max-pooled representation that is generated by introducing shift invariance and scale invariance with respect to the convolutional representation. As further depicted in FIG. 6, the temporal-sequential alert classification machine learning model 506 comprises a flattening layer 603 that is configured to process the max-pooled representation to generate a flattened representation. As further depicted in FIG. 6, the temporal-sequential alert classification machine learning model 506 is a set of dense neural network layers 604 that are configured to process the flattened representation to generate the temporal-sequential alert classification score 507.

Returning to FIG. 5, the process 500 continues when a categorical-sequential alert classification machine learning model 508 processes the categorical neighbor alert representations for the software alert data object 501 that are in the defined temporal window of the software alert data object 501 and are associated with the defined grouping category of the software alert data object 501 using a categorical-sequential alert classification machine learning model 508 to generate a categorical-sequential alert classification score 509 for the software alert data object. While various embodiments of the present invention are described with reference to a machine learning framework having one categorical-sequential machine learning model that is associated with one grouping category of the software alert data object 501, a person of ordinary skill in the relevant technology will recognize that any number of categorical-sequential machine learning models associated with any number of grouping categories of the software alert data object 501 may be utilized. Moreover, in some embodiments, the machine learning framework may utilize no categorical-sequential machine learning models.

A grouping category is any attribute based on which a set of software alert data objects can be divided into a set of groups. Examples of grouping categories include team identifiers of software alert data objects, such that a set of software alert data objects can be divided into a set of team-based groups each comprising a subset of software alert data objects that are associated with a common team identifier. Other examples of grouping categories include days of the week, such that a set of software alert data objects can be divided into a set of groupings each comprising a subset of the software alert data objects whose creation times are associated with a common day of the week. In some embodiments, given a particular software alert data object, those software alert data objects that both occur within a defined temporal window of the particular software alert data object and are associated with a target grouping category of the particular software alert data object are referred to as the categorical neighbor software alert data objects of the particular software alert data object. For example, if the target grouping category relates to the team identifier of the particular software alert data object, the categorical neighbor software alert data objects for the particular software alert data object may include those software alert data objects that are in the defined temporal window of the particular software alert data object and are associated with the team identifier of the particular software alert data object.

The categorical-sequential alert classification machine learning model 508 is configured to process alert representations of categorical neighbor software alert data objects of a particular software alert data object (i.e., categorical neighbor alert representations for the categorical neighbor software alert data objects of the particular software alert data object) to generate a categorical-sequential alert classification score for the particular software alert data object. In some embodiments, the categorical-sequential alert classification machine learning model is configured to process alert representations for a stream of software alert data objects that are within the defined temporal window of a primary software alert data object in the stream and are associated with a target grouping category of the primary software alert data object to generate a likelihood that the stream relates to at least one software incident data object.

In some embodiments, the categorical-sequential alert classification machine learning model 508 is trained using a set of training data entries. In some embodiments, a training data entry describes feature data associated with a stream of software alert data objects and a ground-truth stream classification label that describes whether the stream is related to at least one software incident data object. In some embodiments, the ground-truth stream classification label for a stream of software alert data objects is an affirmative ground-truth stream classification score if the stream comprises all of the software alert data objects that occur within the defined temporal window of a software incident data object and are associated with a team identifier for the software incident data object. In some embodiments, the ground-truth stream classification label for a stream of software alert data objects is a negative ground-truth stream classification score if the stream comprises a set of software alert data objects that are randomly sampled without associations with any defined temporal windows of any software incident data objects and/or without associations with team identifiers of any software incident data objects.

In some embodiments, the categorical-sequential alert classification machine learning model 508 comprises: (i) a set of one-dimensional convolutional layers that are configured to generate a convolutional representation of a stream of alert representations, (ii) a one-dimensional max-pooling layer that is configured to process the convolutional representation to generate a max-pooled representation that is generated by introducing shift invariance and scale invariance with respect to the convolutional representation, (iv) a flattening layer that is configured to process the max-pooled representation to generate a flattened representation, and (v) a set of dense neural network layers that are configured to process the flattened representation to generate the categorical-sequential alert classification score.

In some embodiments, when generating the categorical-sequential alert classification score for a particular software alert data object, the inputs to the categorical-sequential alert classification machine learning model 508 include categorical neighbor alert representations for the categorical neighbor software alert data objects of the particular software alert data object, categorical neighbor software alert data objects for the particular software alert data object, a priority distribution of the categorical neighbor software alert data objects for the particular software alert data object (e.g., a priority distribution describing that 10 percent of the categorical neighbor software alert data objects are associated with a P1 priority level, 20 percent of the categorical neighbor software alert data objects are associated with a P2 priority level, and so on), average inter-arrival time of software alert data objects in the stream comprising the categorical neighbor software alert data objects for the particular software alert data object, and/or text embeddings of natural language data fields of the categorical neighbor software alert data objects for the particular software alert data object.

The categorical-sequential alert classification score 509 for a software alert data object describes a predicted/computed likelihood that the software alert data object is related to at least one software incident data object of a corresponding monitored software application framework. The predicted/computed likelihood is determined based on features of not just the software alert data object itself, but also based on a stream of software alert data objects whose creation times are within the defined temporal window of the particular software alert data object and are associated with a target grouping category (e.g., a team identifier) of the particular software alert data object. The categorical-sequential alert classification score for a software alert data object is generated via processing the categorical neighbor alert representations for categorical neighbor software alert data objects for the particular software alert data object using a categorical-sequential alert classification machine learning model.

In some embodiments, the categorical-sequential alert classification machine learning model 508 has the architecture that is depicted in FIG. 7. As depicted in FIG. 7, the categorical-sequential alert classification machine learning model 508 includes a sequence of N processing units such as processing unit 701, where each processing unit comprises a set of dense neural network layers followed by a set of dropout layers. In some embodiments, the dimensions of the inputs to each successive processing unit decreases, such that the categorical-sequential alert classification machine learning model 508 has a tower pattern. In some embodiments, within each processing unit, dropout layers enhance generalization and reduce overfitting of the output of the dense neural network layers.

Returning to FIG. 5, the process 500 continues when an attention-based alert clustering machine learning model 510 processes attention neighbor attention-based feature sets for the attention neighbor software alert data objects that are in an encoder attention window of the software alert data object 501 to generate an attention-based alert classification score 511 for the software alert data object 501. In some embodiments, the attention-based alert clustering machine learning model 510 comprises an attention-based encoder machine learning model and an encoder-based alert classification machine learning model, where the attention-based encoder machine learning model is configured to generate an attention-based alert encoding for the software alert data object based on attention neighbor attention-based feature sets for attention neighbor software alert data objects that are in an encoder attention window for the software alert data object, and the encoder-based alert classification machine learning model is configured to generate the attention-based alert classification score based on the attention-based alert encoding.

The encoder attention window for a software alert data object describes the combination of: (i) the software alert data object, and (ii) X software alert data objects that occur before the software alert data object and Y software alert data objects that occur after the software alert data object in a defined sequence of software alert data objects for a monitored software application framework (e.g., a sequence defined based on a temporal order of creation times of the software alert data objects of the monitored software alert data object). The software alert data objects that are within the encoder attention window of a particular software alert data object are referred to herein as the "attention neighbor software alert data objects" of the particular software alert data object. In some embodiments, attention-based feature sets for attention neighbor software alert data objects of a particular software alert data object (i.e., attention neighbor alert attention-based feature sets for the attention neighbor software alert data objects of the particular software alert data object) are processed by an attention-based alert classification machine learning framework to generate an attention-based alert classification for the particular software alert data object.

The attention-based alert clustering machine learning model 510 is configured to process attention neighbor attention-based feature sets for attention neighbor software alert data objects of a particular software alert data object to generate an attention-based alert classification score for the particular software alert data object. In some embodiments, the attention-based alert classification machine learning framework comprises: (i) an attention-based encoder machine learning model that is configured to process the attention neighbor attention-based feature sets for the attention neighbor software alert data objects of the particular software alert data object to generate to generate an attention-based alert encoding for the software alert data object, and (ii) an encoder-based alert classification machine learning model that is configured to process the attention-based alert encoding to generate the attention-based alert classification score for the particular software alert data object.

In some embodiments, the attention-based alert clustering machine learning model 510 has the architecture that is depicted in FIG. 8. As depicted in FIG. 8, the attention-based alert clustering machine learning model 510 comprises: (i) an attention-based encoder machine learning model 801 that is configured to process the attention neighbor attention-based feature sets for the attention neighbor software alert data objects of the software alert data object 501 to generate to generate an attention-based alert encoding for the software alert data object 501, and (ii) an encoder-based alert classification machine learning model 802 that is configured to process the attention-based alert encoding to generate the attention-based alert classification score 511 for the software alert data object 501.

As depicted in FIG. 8, the attention-based encoder machine learning model 801 is an encoder machine learning model that is configured to generate an attention-based alert encoding for the software alert data object 501 based on the attention neighbor attention-based feature sets for the attention neighbor software alert data objects that are in the encoder attention window for the software alert data object 501. In some embodiments, the attention-based encoder machine learning model 801 uses an attention mechanism to integrate inferences about relationships across the attention neighbor software alert data objects as part of generating the attention-based alert encoding for the software alert data object.

In some embodiments, the attention-based encoder machine learning model 801 has the architecture that is depicted in FIG. 9. As depicted in FIG. 9, the attention-based encoder machine learning model 801 comprises: (i) a positional embedding layer 901 that is configured to integrate positional embeddings of attention neighbor software alert data objects with attention neighbor attention-based feature sets for the attention neighbor software alert data objects to generate positionally-embedded alert representations for the attention neighbor software alert data objects, (ii) a self-attention block layer 902 that is configured to perform operations of a first self-attention mechanism across the positionally-embedded alert representations for the attention neighbor software alert data objects to generate attention-based alert representations for the attention neighbor software alert data objects, (iii) a first additional and normalization layer 903 that is configured to perform additional and normalization operations across the attention-based alert representations for the attention neighbor software alert data objects based on positionally-embedded alert representations for the attention neighbor software alert data objects to generate normalized attention-based alert representations for the attention neighbor software alert data objects, (iv) a set of fully-connected layers 904 that are configured to process normalized attention-based alert representations for the attention neighbor software alert data objects to generate non-normalized alert encoding for the attention neighbor software alert data objects, (iv) a second additional and normalization layer 905 that is configured to perform additional and normalization operations across the non-normalized alert encodings for the attention neighbor software alert data objects based on the normalized attention-based alert representations for the attention neighbor software alert data objects to generate attention-based alert encodings for the attention neighbor software alert data objects (including the attention-based alert encoding for the software alert data object 501, which is one of the attention neighbor software alert data objects).

In some embodiments, the attention-based encoder machine learning model 801 is trained using an encoder-decoder machine learning framework that comprises an attention-based encoder machine learning model and an attention-based decoder machine learning model. In some embodiments, the encoder-decoder machine learning framework further comprises an intermediate attention block. In some embodiments, during training of the attention-based encoder machine learning model, the attention-based decoder machine learning model is configured to process the output of the attention-based encoder machine learning model and/or the output of the intermediate attention block that is obtained via processing the attention neighbor attention-based feature sets for attention neighbor software alert data objects of a training software alert data object to generate reconstructed attention neighbor attention-based feature sets for the attention neighbor software alert data objects. In some embodiments, trained parameters of the encoder-decoder machine learning framework are then updated based on a deviation measure of the attention-neighbor attention-based feature sets and the reconstructed attention-based feature sets. In some embodiments, to generate reconstructed attention neighbor attention-based feature sets for attention neighbor software alert data objects of a training software alert data object, the encoder-decoder machine learning framework performs the following operations: (i) processing the attention neighbor attention-based feature sets using the attention-based encoder machine learning model to generate an attention-based alert encoding for the training software alert data object, (ii) processing the attention-based alert encodings for the attention neighbor software alert data objects of the training software alert data object using the intermediate attention block to generate the refined attention-based alert encoding for the training software alert data object, and (iii) processing the refined attention-based alert encoding for the attention neighbor software alert data objects of the training software alert data object to generate reconstructed attention-based feature set for the training software alert data object.

In some embodiments, the encoder-decoder machine learning framework that is used to train the attention-based encoder machine learning model 801 has the architecture that is depicted in FIG. 10. As depicted in FIG. 10, the encoder-decoder machine learning framework 900 comprises the attention-based encoder machine learning model 801, an intermediate attention block 1002, and an attention-based decoder machine learning model 1003. In some embodiments, the attention-based decoder machine learning model has the same architecture as the architecture of the attention-based encoder machine learning model 801. In some embodiments, the attention-based alert encoding for a particular software alert data object is the output of the intermediate attention block 1002 for the particular software alert data object, while in other embodiments the attention-based alert encoding for the particular software alert data object is the output of the attention-based encoder machine learning model 801 for the particular software alert data object.

In some embodiments, the intermediate attention block 1002 is configured to process the output of the attention-based encoder machine learning model 801 for a set of attention neighbor software alert data objects (i.e., attention-based alert encodings for the set of attention neighbor software alert data objects) using a second self-attention mechanism to generate a refined attention-based alert encoding for each attention neighbor software alert data object. In some embodiments, the second self-attention mechanism is configured to enable ignoring/forgetting those attention-based alert encodings whose attention neighbor software alert data objects are determined to be unrelated to a primary software alert data object via the attention weights of the second self-attention mechanism. In some embodiments, the attention-based decoder machine learning model 1003 is configured to generate reconstructed attention-based feature sets for the attention neighbor software alert data objects based on the refined attention-based alert encodings for the attention neighbor software alert data objects. In some embodiments, an encoder-decoder framework training measure that is determined based on deviation of the reconstructed attention-based feature sets for the attention neighbor software alert data objects and the actual attention-based feature sets for the attention neighbor software alert data objects is optimized (e.g., minimized) to set optimal values for the trainable parameters of the encoder-decoder machine learning framework 1000, including the trainable parameters of the attention-based encoder machine learning model.

Returning to FIG. 8, the encoder-based alert classification machine learning model 802 is configured to process the attention-based alert encoding to generate the attention-based alert classification score 511 for the software alert data object 501. In some embodiments, the encoder-based alert classification machine learning model 802 comprises a feed-forward fully-connected neural network machine learning model that is configured to process the attention-based alert encoding for the software alert data object 501 to generate the attention-based alert classification score 511 for the software alert data object. The attention-based alert classification score 511 describes a computed/predicted likelihood that a corresponding software alert data object is related to at least one software incident data object. The attention-based alert classification score is generated by the attention-based alert classification machine learning model based on processing attention neighbor attention-based feature sets for attention neighbor software alert data objects that are in the encoder attention window of the particular software alert data object.

In some embodiments, to generate the encoder-based alert classification machine learning model 802, the training engine 112 uses training data stored on the training data storage unit 122 that comprises a set of training data entries. In some embodiments, each training data entry includes: (i) a set of alert attribute data fields for a software alert data object of a monitored software application framework, and (ii) a ground-truth first-order alert classification label that describes whether the software alert relates to at least one software incident data object of the monitored software application framework (e.g., whether the software alert data object is deemed to have caused an incident). In some embodiments, ground-truth classification labels for software alert data objects are generated based on at least one of: (i) user annotations about associations between software alert data objects and software incident data objects of the monitored software application framework (e.g., as entered using the Opsgenie® incident management system), or (ii) alert-incident association heuristics.

Returning to FIG. 5, an alert signature 512 is generated for the software alert data object 501 based on one or more alert classification scores associated with the software alert data object. The alert signature 512 of the software alert data object 501 describes a set of alert classification scores for the software alert data object, where each alert classification score describes a computed/predicted likelihood that the software alert data object is related to at least one software incident data object of a corresponding monitored software application framework. For example, the alert signature for the software alert data object 501 may be determined based on at least one of the first-order alert classification scores for the software alert data object 501, temporal-sequential alert classification score 507 for the software alert data object, one or more categorical-sequential alert classification scores for the software alert data object 501, the attention-based alert classification score 511 for the software alert data object 501, and/or the like. Once generated, the alert signature 512 for the software alert data object 501 is processed by a second-order alert classification machine learning model 513 to generate the alert classification score 521 for the software alert data object 501 (also referred to herein as the second-order alert classification score for the software alert data object 501).

In some embodiments, the alert classification score for the software alert data object can be used to perform one or more incident management actions with respect to the software alert data object. For example, performing the one or more incident management actions may include enabling display of a prediction output user interface that displays the one or more alert signatures. As another example, performing the one or more incident management actions may include enabling display of a prediction output user interface that is configured to receive one or more user feedback data objects for the one or more incident clusters, where at least one of the machine learning models introduced herein is retrained using the one or more user feedback data objects. As yet another example, performing the one or more incident management actions may include enabling display of a prediction output user interface that is configured to display a ranking of the one or more incident clusters in accordance with the one or more cluster priority scores, where the cluster priority score for an incident cluster may be determined by combining each monitoring data priority score for a software alert data object that is in the incident cluster. As a further example, performing the one or more incident management actions may include performing one or more automated system maintenance operations for the software application framework in accordance with the alert signatures. In some embodiments, an incident manager generates an incident review data object after filing a software incident.

Other examples of incident management actions that may be performed by the software monitoring data management computing device 106 include: (i) ranking of the incident clusters (e.g., based on a count of software alert data objects associated with the incident clusters, timestamps of software alert data objects associated with the incident clusters, relevance of software alert data objects associated with the incident clusters to a user, and/or the like) before presenting the incident clusters, (ii) re-ranking of the incident clusters (e.g., based on user feedback and/or any incoming software alert data objects associated with the incident clusters), (iii) cluster pruning (e.g., by removing noisy or less relevant software alert data objects from incident clusters), and (iv) cluster merging (e.g., by merging two or more incident clusters that may have occurred in different timestamps but may otherwise be associated with a common alert signature and/or with similar alert signatures).

In some embodiments, the software monitoring data management computing device 116 generates user interface data that displays, for a particular software alert data object, the predicted alert severity level for the software alert data object that is generated based on the alert classification score for the software alert data object and a human-generated alert severity level for the software alert data object. An example of such a user interface 1100 is depicted in FIG. 11. As depicted in FIG. 11, the user interface 1100 displays, for a software alert data object that is associated with the alert identifier HOT 96626 (which is entered using the user interface element 1101), the predicted alert severity level 1103 and the human-generated alert severity level 1104. As further depicted in FIG. 11, the user interface 1100 displays the textual description 1102 for the software alert data object that is associated with the alert identifier HOT 96626.

In some embodiments, the software monitoring data management computing device 116 generates user interface data that displays an alert signature for a software application framework, where the alert signature describes recall measures, precision measures, and/or F-measures associated with predicted alert severity levels for a set of software alert data objects that are associated with a particular software application framework. For example, the user interface 1300 of FIG. 13 displays, for a set of software alert data objects that are associated with a time range selected using the user interface elements 1201-1202 of the user interface 1200 of FIG. 12), recall measures, precision measures, and $F_1$ measures using the user interface elements 1301-1309. FIG. 13 also provides the user interface element 1311 that depicts, using a left bra and a left bar, accuracy measures for human-generated alert severity levels and predicted alert severity levels for software alert data objects respectively.

In particular, the user interface element 1301 of FIG. 13 depicts, using a right bar and a left bar, the recall rates for predicted alert severity levels indicating a zeroth severity level and for human-generated alert severity levels indicating a zeroth severity level respectively. In other words, the user interface element 1301 depicts (using right left bar) the recall rate for those software alert data objects that are associated with the selected time range and predicted alert severity levels indicating a zeroth severity level, as well as (using the left bar) the recall rate for those software alert data objects that are associated with the selected time range and human-generated alert severity levels indicating a zeroth severity level.

In addition, the user interface element 1302 of FIG. 13 depicts, using a right bar and a left bar, the precision rates for predicted alert severity levels indicating a zeroth severity level and for human-generated alert severity levels indicating a zeroth severity level respectively. In other words, the user interface element 1302 depicts (using the right bar) the precision rate for those software alert data objects that are associated with the selected time range and predicted alert severity levels indicating a zeroth severity level, as well as (using the left bar) the precision rate for those software alert data objects that are associated with the selected time range and human-generated alert severity levels indicating a zeroth severity level.

Furthermore, the user interface element 1303 of FIG. 13 depicts, using a right bar and a left bar, the $F_1$ scores for predicted alert severity levels indicating a zeroth severity level and for human-generated alert severity levels indicating a zeroth severity level respectively. In other words, the user interface element 1303 depicts (using the right bar) the $F_1$ for those software alert data objects that are associated with the selected time range and predicted alert severity levels indicating a zeroth severity level, as well as (using the left bar) the $F_1$ for those software alert data objects that are associated with the selected time range and human-generated alert severity levels indicating a zeroth severity level.

Moreover, the user interface element 1304 of FIG. 13 depicts, using a right bar and a left bar, the recall rates for predicted alert severity levels indicating a first severity level and for human-generated alert severity levels indicating a first severity level respectively. In other words, the user interface element 1304 depicts (using the right bar) the recall rate for those software alert data objects that are associated with the selected time range and predicted alert severity levels indicating a first severity level, as well as (using the left bar) the recall rate for those software alert data objects that are associated with the selected time range and human-generated alert severity levels indicating a first severity level.

Additionally, the user interface element 1305 of FIG. 13 depicts, using a right bar and a left bar, the precision rates for predicted alert severity levels indicating a first severity level and for human-generated alert severity levels indicating a first severity level respectively. In other words, the user interface element 1305 depicts (using the right bar) the precision rate for those software alert data objects that are associated with the selected time range and predicted alert severity levels indicating a first severity level, as well as (using the left bar) the precision rate for those software alert data objects that are associated with the selected time range and human-generated alert severity levels indicating a first severity level.

Furthermore, the user interface element 1306 of FIG. 13 depicts, using a right bar and a left bar, the $F_1$ scores for predicted alert severity levels indicating a first severity level and for human-generated alert severity levels indicating a first severity level respectively. In other words, the user interface element 1306 depicts (using the right bar) the $F_1$ for those software alert data objects that are associated with the selected time range and predicted alert severity levels indicating a first severity level, as well as (using the left bar) the $F_1$ for those software alert data objects that are associated with the selected time range and human-generated alert severity levels indicating a first severity level.

Furthermore, the user interface element 1307 of FIG. 13 depicts, using a right bar and a left bar, the recall rates for predicted alert severity levels indicating a second severity level and for human-generated alert severity levels indicating a second severity level respectively. In other words, the user interface element 1307 depicts (using the right bar) the recall rate for those software alert data objects that are associated with the selected time range and predicted alert severity levels indicating a second severity level, as well as (using the left bar) the recall rate for those software alert data objects that are associated with the selected time range and human-generated alert severity levels indicating a second severity level.

Additionally, the user interface element 1308 of FIG. 13 depicts, using a right bar and a left bar, the precision rates for predicted alert severity levels indicating a second severity level and for human-generated alert severity levels indicating a second severity level respectively. In other words, the user interface element 1308 depicts (using the right bar) the precision rate for those software alert data objects that are associated with the selected time range and predicted alert severity levels indicating a second severity level, as well as (using the left bar) the precision rate for those software alert data objects that are associated with the selected time range and human-generated alert severity levels indicating a second severity level.

Moreover, the user interface element 1309 of FIG. 13 depicts, using a right bar and a left bar, the $F_1$ scores for predicted alert severity levels indicating a second severity level and for human-generated alert severity levels indicating a second severity level respectively. In other words, the user interface element 1309 depicts (using the right bar) the $F_1$ for those software alert data objects that are associated with the selected time range and predicted alert severity levels indicating a second severity level, as well as (using the left bar) the $F_1$ for those software alert data objects that are associated with the selected time range and human-generated alert severity levels indicating a second severity level. Accordingly, to address a range of challenges related to monitoring complex software application frameworks, various embodiments of the present invention describe techniques for generating alert signatures for a complex software application framework that are determined based on predicted alert severity levels for software alert data objects. These predicted alert severity levels may be generated by various machine learning techniques in order to generate effective alert signatures for a software application framework. By using the described techniques, various embodiments of the present invention generate predictive insights about severity levels of software alert data objects that can be used to increase efficiency and effectiveness of software application and software service monitoring. In doing so, various embodiments of the present invention make substantial technical contributions to improving the efficiency and the effectiveness of monitoring complex software application frameworks.

Additional Implementation Details

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to a suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including, by way of example, a programmable processor, a computer, a system on a chip, or multiple chips?, or combinations of the foregoing. The apparatus can include special purpose logic circuitry, e.g., an FPGA (field programmable gate array) or an ASIC (Application Specific Integrated Circuit). The apparatus can also include, in addition to hardware, code that creates a limited interaction mode and/or a non-limited interaction mode for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language page), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending pages to and receiving pages from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results unless described otherwise. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. An apparatus for predictive monitoring of a software application framework, the apparatus comprising at least one processor and at least one non-transitory memory comprising a computer program code, the at least one non-transitory memory and the computer program code configured to, with the at least one processor, cause the apparatus to:
   identify a software alert data object for the software application framework, wherein the software alert data object is associated with one or more alert attribute data fields;
   generate, using a first-order alert classification machine learning model and based on the one or more alert attribute data fields, an alert representation for the software alert data object, wherein the first-order alert classification machine learning model is configured to generate the alert representation and generate a first-order alert classification score for the software alert data object based on the alert representation;
   identify a defined number of attention neighbor software alert data objects, wherein the defined number of attention neighbor software alert data objects are in an encoder attention window for the software alert data object;
   generate, using an attention-based classification machine learning framework and based on a defined number of attention neighbor attention-based feature sets for the defined number of attention neighbor software alert data objects, an attention-based alert classification score for the software alert data object, wherein each attention neighbor attention-based feature set for a particular attention neighbor software alert data object is determined based on the alert representation for the particular attention neighbor software alert data object;
   generate an alert signature for the software alert data object based on the attention-based alert classification score; and
   perform one or more incident management actions based on the alert signature.

2. The apparatus of claim 1, wherein performing the one or more incident management actions comprises:
   generating, using a second-order alert classification machine learning model and based on the alert signature, a second-order alert classification score for the software alert data object; and
   performing the one or more incident management actions based on the second-order alert classification score.

3. The apparatus of claim 1, wherein generating the alert signature comprises:
   identifying one or more temporal neighbor software alert data objects that are associated with a defined temporal window for the software alert data object;
   generating, using a temporal-sequential alert classification machine learning model and based on one or more temporal neighbor alert representations for the one or more temporal neighbor software alert data objects, a temporal-sequential alert classification score for the software alert data object; and
   generating the alert signature based on the temporal-sequential alert classification score.

4. The apparatus of claim 1, wherein:
   the attention-based classification machine learning framework comprises an attention-based encoder machine learning model and an encoder-based alert classification machine learning model;
   the attention-based encoder machine learning model is configured to generate an attention-based alert encoding for the software alert data object based on the defined number of attention neighbor attention-based feature sets for the defined number of attention neighbor software alert data objects that are in the encoder attention window for the software alert data object, and
   the encoder-based alert classification machine learning model is configured to generate the attention-based alert classification score based on the attention-based alert encoding.

5. The apparatus of claim 4, wherein the attention-based encoder machine learning model is trained using an encoder-decoder machine learning framework.

6. The apparatus of claim 5, wherein the encoder-decoder machine learning framework comprises:
   the attention-based encoder machine learning model that is associated with an encoder attention block,
   an intermediate attention block,
   an attention-based decoder machine learning model that is associated with a decoder attention block.

7. The apparatus of claim 6, wherein training of the encoder-decoder machine learning framework using a training software alert data object comprises:
   generating, using the attention-based encoder machine learning model and based on a training attention-based feature set for the training software alert data object, a training alert encoding for the training software alert data object;
   generating, using the intermediate attention block and the attention-based decoder machine learning model and based on the training alert encoding, a reconstructed attention-based feature set for the training software alert data object;
   determining an encoder-decoder framework training measure for the encoder-decoder machine learning framework based on the training attention-based feature set and the reconstructed attention-based feature set; and
   determining one or more updated parameters for the encoder-decoder machine learning framework based on the encoder-decoder framework training measure.

8. The apparatus of claim 7, wherein the encoder attention block, the intermediate attention block, and the decoder attention block are all associated with the encoder attention window.

9. The apparatus of claim 1, wherein generating the alert signature further comprises:
identifying one or more grouping categories for the software alert data object;
for each grouping category:
identifying one or more categorical neighbor software alert data objects that are associated with the grouping category and a defined temporal window of the software alert data object, and
generating, using a categorical-sequential alert classification machine learning model that is associated with the grouping category and based on one or more categorical neighbor alert representations for the one or more categorical neighbor software alert data objects, a categorical-sequential alert classification score for the software alert data object; and
generating the alert signature based on each categorical-sequential alert classification score.

10. The apparatus of claim 1, wherein:
the at least one non-transitory memory and the computer program code are further configured to, with the at least one processor, cause the apparatus to generate, using an alert clustering machine learning model and based on a plurality of alert representations for a plurality of software alert data objects that comprise the software alert data object, an alert cluster for the alert representation; and
at least one of the one or more incident management actions is performed based on the alert cluster.

11. The apparatus of claim 10, wherein:
the at least one non-transitory memory and the computer program code are further configured to, with the at least one processor, cause the apparatus to generate an alert cluster score for the alert cluster based on at least one of: (i) an alert count for the alert cluster, (ii) a priority distribution score for the alert cluster, or (iii) inter-alert arrival time distribution for the alert cluster; and
at least one of the one or more incident management actions is performed based on the alert cluster score.

12. A computer-implemented method for predictive monitoring of a software application framework, the computer-implemented method comprising:
identifying a software alert data object for the software application framework, wherein the software alert data object is associated with one or more alert attribute data fields;
generating, using a first-order alert classification machine learning model and based on the one or more alert attribute data fields, an alert representation for the software alert data object, wherein the first-order alert classification machine learning model is configured to generate the alert representation and generate a first-order alert classification score for the software alert data object based on the alert representation;
identifying a defined number of attention neighbor software alert data objects, wherein the defined number of attention neighbor software alert data objects are in an encoder attention window for the software alert data object;
generating, using an attention-based classification machine learning framework and based on a defined number of attention neighbor attention-based feature sets for the defined number of attention neighbor software alert data objects, an attention-based alert classification score for the software alert data object, wherein each attention neighbor attention-based feature set for a particular attention neighbor software alert data object is determined based on the alert representation for the particular attention neighbor software alert data object;
generating an alert signature for the software alert data object based on the attention-based alert classification score; and
performing one or more incident management actions based on the alert signature.

13. The computer-implemented method of claim 12, wherein performing the one or more incident management actions comprises:
generating, using a second-order alert classification machine learning model and based on the alert signature, a second-order alert classification score for the software alert data object; and
performing the one or more incident management actions based on the second-order alert classification score.

14. The computer-implemented method of claim 12, wherein generating the alert signature comprises:
identifying one or more temporal neighbor software alert data objects that are associated with a defined temporal window for the software alert data object;
generating, using a temporal-sequential alert classification machine learning model and based on one or more temporal neighbor alert representations for the one or more temporal neighbor software alert data objects, a temporal-sequential alert classification score for the software alert data object; and
generating the alert signature based on the temporal-sequential alert classification score.

15. The computer-implemented method of claim 12, wherein:
the attention-based classification machine learning framework comprises an attention-based encoder machine learning model and an encoder-based alert classification machine learning model;
the attention-based encoder machine learning model is configured to generate an attention-based alert encoding for the software alert data object based on the defined number of attention neighbor attention-based feature sets for the defined number of attention neighbor software alert data objects that are in the encoder attention window for the software alert data object, and
the encoder-based alert classification machine learning model is configured to generate the attention-based alert classification score based on the attention-based alert encoding.

16. The computer-implemented method of claim 15, wherein the attention-based encoder machine learning model is trained using an encoder-decoder machine learning framework.

17. The computer-implemented method of claim 16, wherein the encoder-decoder machine learning framework comprises:
the attention-based encoder machine learning model that is associated with an encoder attention block,
an intermediate attention block,
an attention-based decoder machine learning model that is associated with a decoder attention block.

18. The computer-implemented method of claim 17, wherein training of the encoder-decoder machine learning framework using a training software alert data object comprises:

generating, using the attention-based encoder machine learning model and based on a training attention-based feature set for the training software alert data object, a training alert encoding for the training software alert data object;

generating, using the intermediate attention block and the attention-based decoder machine learning model and based on the training alert encoding, a reconstructed attention-based feature set for the training software alert data object;

determining an encoder-decoder framework training measure for the encoder-decoder machine learning framework based on the training attention-based feature set and the reconstructed attention-based feature set; and determining one or more updated parameters for the encoder-decoder machine learning framework based on the encoder-decoder framework training measure.

19. The computer-implemented method of claim 12, wherein generating the alert signature further comprises:

identifying one or more grouping categories for the software alert data object;

for each grouping category:
- identifying one or more categorical neighbor software alert data objects that are associated with the grouping category and a defined temporal window of the software alert data object, and
- generating, using a categorical-sequential alert classification machine learning model that is associated with the grouping category and based on one or more categorical neighbor alert representations for the one or more categorical neighbor software alert data objects, a categorical-sequential alert classification score for the software alert data object; and generating the alert signature based on each categorical-sequential alert classification score.

20. A computer program product for predictive monitoring of a software application framework, the computer program product comprising at least one non-transitory computer-readable storage medium having computer-readable program code portions stored therein, the computer-readable program code portions configured to:

identify a software alert data object for the software application framework, wherein the software alert data object is associated with one or more alert attribute data fields;

generate, using a first-order alert classification machine learning model and based on the one or more alert attribute data fields, an alert representation for the software alert data object, wherein the first-order alert classification machine learning model is configured to generate the alert representation and generate a first-order alert classification score for the software alert data object based on the alert representation;

identify a defined number of attention neighbor software alert data objects, wherein the defined number of attention neighbor software alert data objects are in an encoder attention window for the software alert data object;

generate, using an attention-based classification machine learning framework and based on a defined number of attention neighbor attention-based feature sets for the defined number of attention neighbor software alert data objects, an attention-based alert classification score for the software alert data object, wherein each attention neighbor attention-based feature set for a particular attention neighbor software alert data object is determined based on the alert representation for the particular attention neighbor software alert data object;

generate an alert signature for the software alert data object based on the attention-based alert classification score; and perform one or more incident management actions based on the alert signature.

* * * * *